Jan. 16, 1968  J. M. HUNT  3,363,331
FLIGHT SIMULATOR
Filed Feb. 21, 1963  6 Sheets-Sheet 1

JOHN M. HUNT
INVENTOR

BY [signature]
ATTORNEY

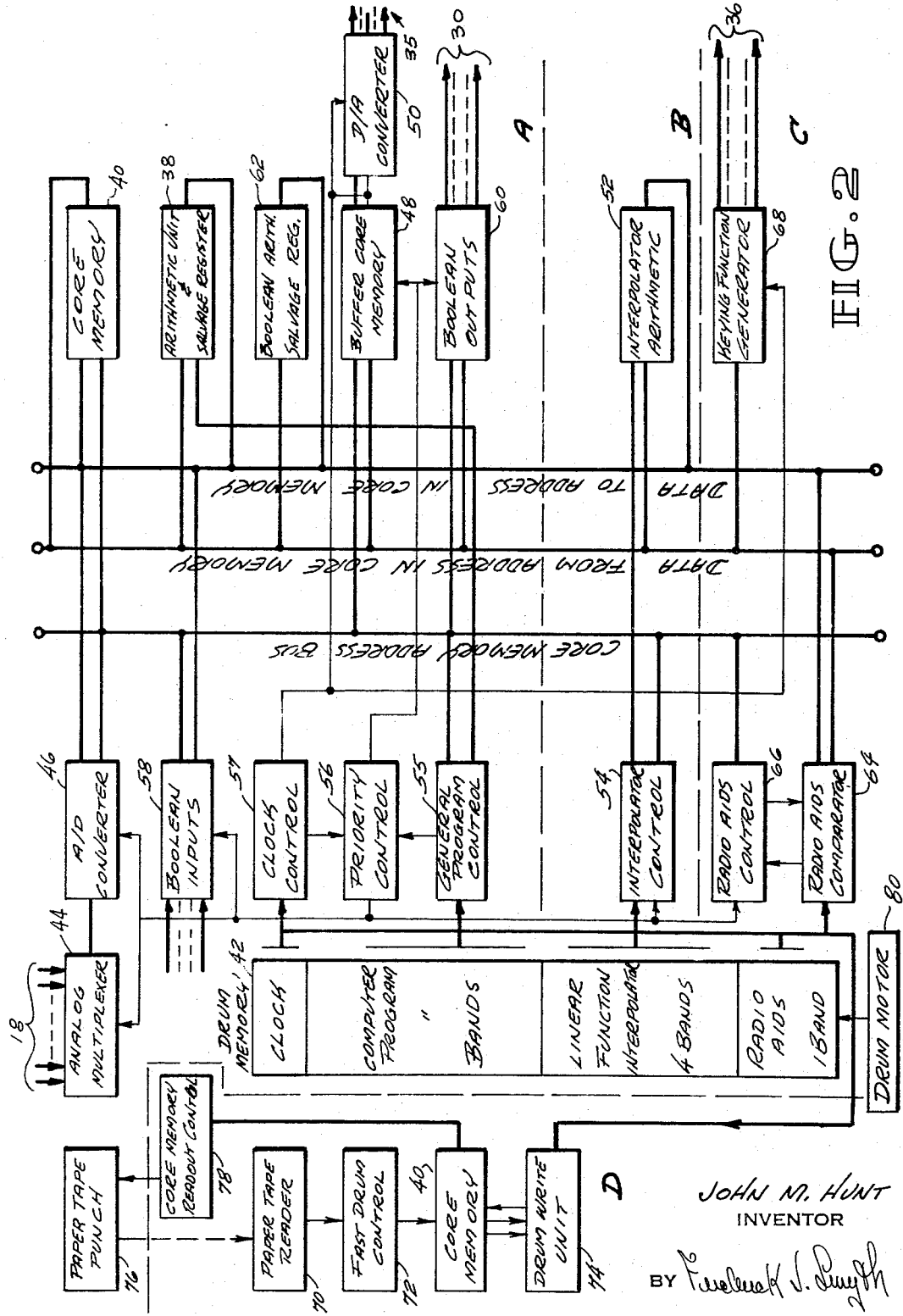

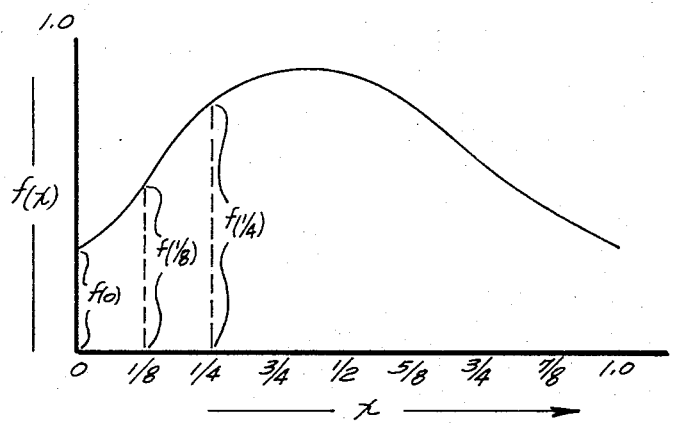

Jan. 16, 1968   J. M. HUNT   3,363,331
FLIGHT SIMULATOR

Filed Feb. 21, 1963   6 Sheets-Sheet 5

JOHN M. HUNT
INVENTOR

BY [signature]
ATTORNEY

Jan. 16, 1968   J. M. HUNT   3,363,331
FLIGHT SIMULATOR

Filed Feb. 21, 1963   6 Sheets-Sheet 6

JOHN M. HUNT
INVENTOR

United States Patent Office 3,363,331
Patented Jan. 16, 1968

3,363,331
FLIGHT SIMULATOR
John M. Hunt, Hillcrest, N.Y., assignor to General Precision Systems Inc., a corporation of Delaware
Filed Feb. 21, 1963, Ser. No. 261,248
23 Claims. (Cl. 35—12)

This invention relates to a flight simulator, and more particularly to an improved simulator for simulating the flight of an aircraft for use in training and testing of aircraft operating personnel.

Because of the expense and danger involved in training and testing pilots and other operating personnel in actual aircraft, the use of grounded flight trainers or flight simulators has become common. Such simulators conventionally comprise a grounded cockpit resembling in great detail the cockpit of the actual aircraft to be simulated, including a number of dummy controls and indicators corresponding to most, if not all, of the controls and indicators of the actual aircraft. The dummy controls are operable by the student pilot, or the student crew, and the indicators are observable by, or audible to, the pilot and crew. The dummy controls are conventionally connected to provide input signals to extensive analog computation equipment which continuously solves the equations of motion of the simulated aircraft, providing output signals to operate the indicators observable by the students, so that the indicators provide the same indications that corresponding indicators in the actual aircraft would provide in response to corresponding control motions. Usually a number of further controls and switches are provided for manipulation by an instructor to simulate various environmental and emergency conditions, such as the velocity and direction of a simulated wind wing ice, and engine fires, for example. In addition to the controls and indicators simulating operation of the aircraft itself, most flight simulators incorporate, as well, dummy controls and indicators simulating those of aircraft radio navigation equipment. Many flight simulators further incorporate visual display systems which provide simulated views of airports or aircraft carrier landing decks. While most contemporary flight simulators are "grounded" in the sense that they do not travel about in the room in which they are installed, many incorporate cockpit motion arrangements, which pitch and bank the cockpit mock-up to provide proprioceptive effects which enhance the realism of simulated flight.

For approximately two decades most large, highly-realistic flight simulators have comprised very large-scale electronic analog computers incorporating many dozens of servomechanisms, many hundreds of potentiometers and large numbers of amplifiers and associated analog computer devices. Realistic simulation of any aircraft involves the solution of a large number of equations having many non-linear coefficients, and in contemporary analog flight simulators the provision of such coefficients has generally been accomplished by adjusting taps on potentiometer windings, by providing specially-wound or "shaped" potentiometers, by diode limiting circuits and the like, and many hundreds of adjustments are necessary to make an analog simulator faithfully perform in accordance with the data pertaining to a specific aircraft. In an analog computer, the thousands of constants in the equations being solved are physically built into the computer in the form of resistor sizes, potentiometer tap settings, mechanical cam shapes and the like.

In order that a flight simulator be available as soon as possible to train crews for a new type of aircraft, it has become common to design and construct flight simulators at the same time the new aircraft is being constructed, using wind tunnel derived test data, calculated data and other data, in order to design and adjust the simulator properly. Because the design of any elaborate device such as a new jet transport aircraft proceeds in part by trial and error, many changes in the aircraft design are made as design, construction and initial testing proceed, and corresponding changes must be made in a flight simulator if it is to realistically simulate the completed aircraft. And even after a new aircraft may have been in service for a substantial period, modifications made to it, or the addition of newly-available equipment to it, frequently will so affect its operation that a previously realistic simulator needs drastic modification in order to remain realistic. Frequently, very simple or minor structural changes in an aircraft cause drastic changes in aircraft operation, requiring a major re-working of the simulator. Sometimes modifications to an actual aircraft have so drastically affected aircraft performance that it has become more practical, economically, to design a new simulator than to try to modify an existing, previously realistic simulator.

Contemporary analog computer flight simulators universally have been constructed to solve equations which largely are not theoretically rigorous, since many small or second-order effects are not discernible to a student and hence unnecessary for realistic training, and the omission of equipment for simulating such effects results in great savings. The cost of a theoretically rigorous simulator is generally regarded to be so great as to be impractical. The various computing elements of an analog computer are wired or interconnected in accordance with the terms of the modified or simplified equations it uses, however, and usually the addition of a given term to an equation requires a substantial revision of the analog computer wiring. Because a given term in a given equation may be quite minor in the simulation of one aircraft but of considerable importance in the simulation of a different aircraft, it will be seen that, having omitted many terms of various equations for sake of economy, a given analog computer is useful only for the simulation of one type of aircraft, and a much differently-wired analog computer is necessary for a different aircraft. Because an extremely large number of resistor values, potentiometer tap settings and like values must be calculated in order to design a given analog computer, and because much of the design usually must be done over again to simulate a modified aircraft or a different aircraft, the cost of analog computer flight simulators has been great, and particularly great considering the slight aircraft design changes may sometimes render them unrealistic soon after they are put into service.

In the present invention, by the use of digital computing equipment, the thousands of design constants of a given aircraft, rather than being represented by resistor sizes and the like, are represented merely by stored digital numbers, which may be fed into a magnetic drum or core memory from punched cards or punched tape, for example, and hence changes in any of the aircraft constants may be made readily and easily in the simulator of the invention merely by erasing the magnetically-stored data and feeding in modified data from different cards or tape. Thus, drastic revisions in aircraft data may be introduced into the simulator at extremely low cost to update the simulator. Furthermore, since the form of the equations solved in the instant invention depends upon the program stored, rather than on the manner in which thousands of wires are interconnected, the same form of digital computer, constructed in accordance with the invention, may be used to simulate extremely widely varying types of aircraft merely by altering various of the instructions in the computer program, so that the computer itself need not be redesigned, thereby resulting in extreme savings in the cost of a flight simulator.

It has been known generally in the automatic control and computer arts, that digital computing techniques may be substituted for certain analog computer techniques, and, further, that any desired degree of accuracy may be obtained by digital computer solution of an equation if sufficient equipment and time are available. In fact, many aircraft flight equations are commonly solved on large-scale general purpose computers in connection with aircraft design, to provide data useful in designing an aircraft. In a training device, however, it is absolutely essential that aircraft dynamic equations be solved in real time in order to provide realistic indications to a student aircraft crew. While an immense amount of effort has been, and continues to be, directed toward increasing the speed of digital computers, the use of digital computers is still largely limited to solution of those aircraft equations in which the variables change relatively slowly. For example, a digital computer might excel in computing with great accuracy the position of an aircraft traveling on a 1000 mile flight over a period of one hour, but be wholly incapable of providing a suitable output to a simulated pitch angle indicator to simulate the fraction-of-a-second short period response of the aircraft when the pilot nudges the elevator control.

In the digital computer employed in the flight trainer of the present invention, the following four general types of computations are involved:
(1) Flight equations
(2) Engine and aerodynamic coefficients
(3) Accessory systems and instructor inputs
(4) Radio navigation The solution of six fundamental flight equations, by way of example, in order to simulate the dynamics of an aircraft requires that many calculations be performed at a high speed, over and over again. In analog systems, many servomechanism-driven instruments have been required to have a frequency response of at least several cycles per second. Because some aircraft indications vary rapidly, it is necessary that some flight equations be solved at a speed approaching 20 solutions per second so that the indications observed by the pilot be realistic. The solution of the equations of motion repeatedly at an iterative rate of 20 solutions per second is accomplished, in the invention, by means of a high-speed parallel-arithmetic computer equipped with a random-access core memory. This computer performs all of the required arithmetic operations (add, subtract, multiply, divide, square, square root, shift and absolute value) under program control.

The calculation of aircraft engine parameters and aerodynamic coefficients requires the generation of a large number of arbitrary functions (of one, two and three variables) representing empirical aircraft engine and aerodynamic data. In conventional digital computers, it is necessary to develop a polynomial expression for each arbitrary function, and to program the computer to solve the expression for all values of all variables. These operations are very time-consuming and require considerable skill in mathematical data reduction and curve-fitting to achieve a satisfactory polynomial expression. Furthermore, since the functions can change quite rapidly in a flight simulator, a high iteration rate is necessary in the solution of the polynomials, involving many program steps, so that much extremely fast computer equipment is needed. In the invention, on the other hand, function generation is effected by straightforward linear interpolation, using straight-line-segment function curves, which, in most cases, need not be mathematically manipulated, as they correspond to data derived from wind tunnel tests, engine operation tests, etc., and these function interpolations take place sequentially and are repeatedly performed several times per second. Further, they are performed independently of the main program associated with the flight equations, and therefore require no attention from the programmer. The stored function curves are entered directly as numerical data along with the core memory address of the interpolated result. Because of such simplicity of organization, it is quite easy to change individual function curves as aircraft data change without the necessity of extensive mathematical data reduction.

The simulation of aircraft accessory systems and instruction input signals primarily involves switching logic and only a small amount of arithmetic computation. Thus the computer is required to handle large numbers of separate Boolean (one-bit) words representing switching (on-off) functions. While many prior computers are capable of incorporating two or more independent bits of Boolean information into one computer word, they usually require several extra program steps to extract a desired item from the various items of information contained in a given word. In the invention, a separate arithmetic unit is provided, which can perform programmed Boolean operations on a large number of independently addressable, single-bit words stored in a functionally separate section of the random-access core memory. Since each single-bit word can be individually addressed, no extra instructions need be written or executed to obtain access to the desired word. This arrangement considerably conserves the expensive core memory. Furthermore, by minimizing the number of instructions that must be performed, it also reduces the labor and time required for initial programming and reprogramming. Although relays may still be used where large amounts of power are switched, the provision of Boolean switching in the separate arithmetic unit has eliminated the many racks of relays commonly used in flight simulators which employ an associated analog computer.

In contemporary flight simulators, radio navigation simulation, despite its great importance to training, has, in general, been rather inaccurate, and most simulators, for reasons of expense, have not been able to simulate more than six or eight different radio facilities. In the invention, however, a relatively large number of separate and independent navigation transmitters can be simulated. On the basis of simulated receiver tuning and simulated aircraft geographic position the invention automatically selects the one best transmitter, if any, to be received for each navigation receiver aboard the simulated aircraft. Programmed operations are required solely for the calculations associated with the nature of the transmitter and receiver and the simulated physical situation between them. The automatic selection of a transmitter for a given receiver and the transfer of the stored data defining location and characteristics of the transmitter are accomplished independently of the main program, and, as in the case of function generation, do not subtract from the time available for executing programmed arithmetic operations.

The digital computer portion of the flight simulator system is required to receive a multitude of input signals which depend upon dummy control manipulations of the student and instructor, and required to provide a large number of output signals to actuate indicators and instruments. The input system of the digital computer of the present invention automatically scans analog inputs, converts them to digital form and loads them into preassigned core memory locations. The output system reads variables from preassigned core memory locations, converts them to analog quantities and makes them available on separate output lines for use in driving indicators and instruments. In addition, a large number of single-bit input functions are scanned and inserted into preassigned core memory locations, and a large number of single-bit output signals are made available from preassigned core locations. In a specific embodiment to be described in detail, there is provided apparatus for 126 analog inputs, 192 analog outputs, 1024 Boolean inputs and 256 Boolean outputs.

Unlike conventional digital computer input/output systems, the present invention operates automatically and requires no instructions to be performed to accomplish the input-output memory transfers or to accomplish the conversions to or from digital form. No time is subtracted from the time available for the execution of the steps of the main program, and no instructions need be written to accomplish the input-output functions.

In usual digital computers designed for scientific problems, core memories are usually used for instruction storage, and because core memories are relatively expensive, most scientific computers have, compared to the present invention, a rather limited program storage capacity. Since the program in a computer associated with a flight simulator is changed very infrequently, however, it can be stored permanently on a magnetic storage drum until such time as changes and/or updating are required. Further, in order to use their expensive core storage efficiently, scientific computers commonly resort to elaborate programming techniques, such as looping, branching and instruction modification, depending upon computational results. Additionally, a time penalty also results in such computers, because after the execution of each instruction the computer must wait for the next instruction to be obtained from the core memory. In the invention no such waste of time occurs, since the instructions are stored on the magnetic drum in the exact order in which they are to be performed, and as one instruction is being performed by the arithmetic element, the next one to be performed is moving into position to be read. When it is in position, it is read and performed without waiting. In the invention, as will be understood as the description proceeds, most instructions require only one access to the core memory, others require no access at all, and no instructions require more than one core memory access.

Since program instructions are never modified intentionally within the computer, errors cannot occur as a result of such modification, and instructions are never altered accidentally, as sometimes occurs in conventional prior art digital computers. Storage of the program on a magnetic drum will be recognized as being far less expensive than a core memory of equivalent capacity. In the specific embodiment described herein, the magnetic drum contains storage space for 45,056 instructions. Of these, 4096 are performed 20 times per second, 8192 are performed five times per second, and 32,588 are performed every 0.8 second. As mentioned above, none of these instructions are required to be used by the automatic radio system, the function generator, or the computer automatic input-output system, which latter systems operate automatically in parallel with the digital computer stored instructions.

It is an object of the invention, therefore, to provide an improved flight simulator.

Another object of the invention is to provide a novel flight simulator which incorporates a special purpose digital computer.

A further object of the invention is to provide an improved digital computer for use in a grounded flight trainer system which continually and automatically provides up-dated engine and aerodynamic coefficients together with radio navigation data wherein such information is available independently of the main computer program.

Still another object of the invention is to provide a grounded flight trainer system which includes an optimally designed digital computer that is relatively easy to program to thereby supply up-dated real-time simulated flight data.

Yet another object of the invention is to provide an improved flight simulator which is readily adaptable to changes in the design of the aircraft being simulated.

A related object of the invention is to provide a special purpose digital computer for use in large scale simulation and control installations.

Another object of the invention is to provide an improved digital computer for use in a flight simulator wherein the main computer program is stored in parallel with other necessary system constants upon a magnetic drum.

Yet another object of the invention is to provide a grounded flight trainer which affords improved simulated radio navigation aids.

A still further object of the invention is to provide a flight simulator including a digital computer together with the necessary analog to digital input equipment and digital to analog output equipment wherein the input/output equipment automatically operates independently of the main computer program.

Another principal object of the invention is to provide an improved flight simulator adaptable to flexible programming.

A further object of the invention is to provide a flight simulator incorporating improved means for generating a large number of arbitrary functions of one, two, and/or three variables representing empirical aircraft engine and aerodynamic data.

Another related object of the invention is to provide an improved digital computer for use in a grounded flight trainer system which simultaneously solves flight equations, generates engine and aerodynamic coefficients, and determines simulated radio navigation data receivable by the flight trainer.

The invention accordingly comprises the features of construction, combination or elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is a more detailed block diagram of the digital computer shown in FIG. 1.

FIG. 6 is a timing diagram showing the operation of the Boolean arithmetic unit and salvage register shown in the block diagram of FIG. 2.

FIG. 7 illustrates an arbitrary function of $x$ useful in explaining the operation of the linear function interpolator shown in the block diagram of FIG. 2.

Figure 1:
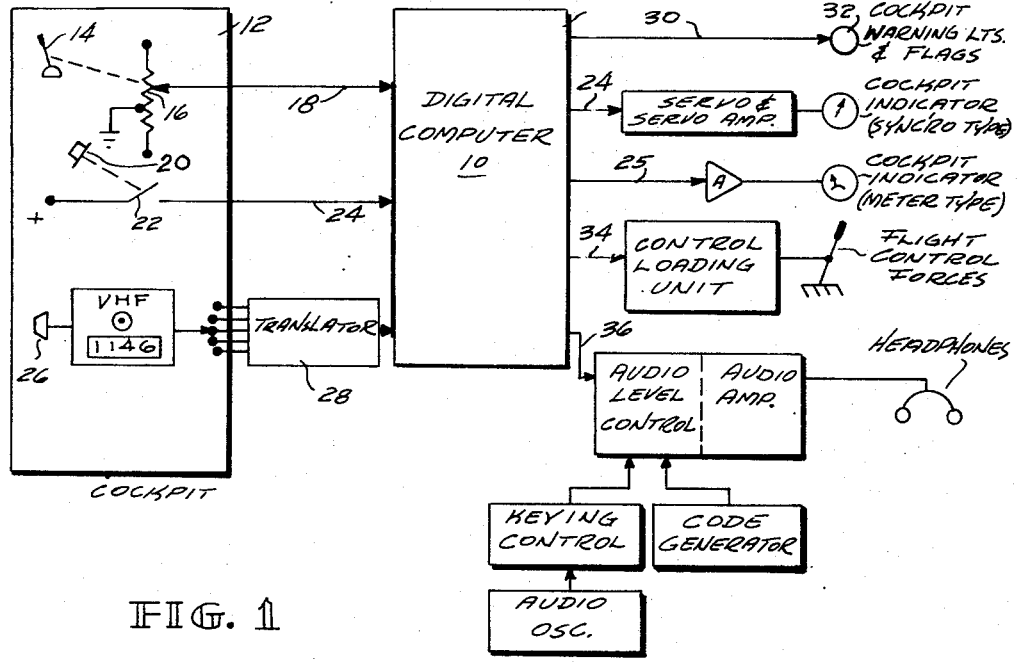
FIG. 1 is a simplified block diagram of a preferred embodiment of the flight simulator of the invention.

The general overall interconnection of the various units of a typical flight simulator constructed in accordance with the present invention may best be understood with reference now to FIG. 1. In general, it can be seen that the major problems to be solved by a computer 10 are:

(1) Accept all cockpit and instructor inputs, such as flight controls, engine controls, accessory system switching functions, radio navigation controls, and malfunction controls.

(2) Compute solutions to all aircraft equations of motion throughout the flight envelope of the aircraft for normal and emergency flight situations.

(3) Compute solutions to all engine equations for normal and emergency operation of the engines.

(4) Compute solutions to all switching logic equations used to define aircraft accessory systems operation, for normal and emergency operation.

(5) Compute all navigation equation solutions.

(6) Provide appropriate outputs to cockpit and instructor station indicators, lights, and audio devices, recorders, and control force generating equipment.

The manner in which each of these problem areas is handled is hereinafter described in detail. Briefly, computer 10 performs all of the arithmetic and Boolean operation required in the modern flight simulator, and solves the equations which represent the characteristics of the airframe, the onboard systems including the engines, and the complete radio-navigation problem.

Continuing now with FIG. 1, there is shown at 12, three control devices which represent various types of typical dummy control devices contained within the cockpit mock-up of a flight simulator. A student-operated control 14 is connected to position the wiper arm of potentiometer 16, thereby to derive a voltage which varies in accordance with the position of control 14. In prior art analog simulators a plurality of similar control-operated potentiometers have commonly been provided to provide analog signals commensurate with the position of various flight and engine controls, such as throttles, rudder pedals, control stick elevator and aileron positions, wing flap positions, brake pedal position, and the like, and a similar plurality of potentiometers are provided in the present invention. A variety of controls which produce analog voltages depending on control manipulation are also commonly provided for actuation by the instructor, either at a station within the simulator cockpit or sometimes at a remote station for the instructor to set in desired environmental or emergency conditions, such as wind velocity, outside air temperature, magnetic variation, and many others. All of these analog signals are coupled to digital computer 10 along a plurality of lines similar to that indicated as 18 in FIG. 1. In FIG. 1, a further student-operated control 20 is connected to open and close an electrical switch 22, and thereby to derive a Boolean, or on-off signal on line 24. In the present simulator, as well as in contemporary analog simulators, a plurality of such switches are provided for actuation by a student or by the instructor. A further control 26 represents the knob of a simulated radio received channel selector switch by means of which a student is enabled to "tune" a simulated radio receiver to a desired simulated station. In the present simulator, as well as in most contemporary analog computer flight simulators, a plurality of similar controls providing similar signals are commonly provided. These signals are coupled to a translator 28 to provide digital signals as hereinafter described.

In the present invention the plurality of analog input signals represented by a voltage on each line 18 are applied to the input system of the digital computer portion represented by block 10 in FIG. 1, and as mentioned above the computer 10 portion of the preferred embodiment is constructed to accommodate as many as 126 different DC analog input voltages simultaneously. While the specific embodiment described herein utilizes analog voltage-deriving devices connected to the dummy controls and then digitizes or encodes the analog voltages by means of an electronic analog-to-digital converter described below, it is within the scope of the invention to use instead conventional shaft position encoders mechanically connected to be positioned by the dummy controls and thereby generate some or all of the dummy control inputs to computer 10. The use of shaft encoders eliminates the time required for analog-to-digital conversion, but necessitates such a large increase in the number of wires which must be connected from the dummy controls to the computer that the use of a converter, as shown, is preferred.

The plurality of single-bit or "on-off" signals represented by the voltage on the plurality of lines such as 24 are applied to computer 10, and the preferred embodiment is designed to receive as many as 1024 such input signals simultaneously. The input signal represented by the output of translator 28 actually comprises parallel multiple-bit binary signals which are applied to some of the 1024 single-bit lines of computer 10.

The output signals from computer 10 are typified by the five different types shown in FIG. 1. A plurality of single-bit output signals represented by the "on-off" signals on line 30 are provided to operate various on-off indicating devices, such as cockpit warning light 32 via a relay (not shown) in those instances where appreciable current must be switched. Analog output signals are applied to control simulator hydraulic control loading devices of known type along a plurality of lines 34 to apply forces to the simulator control column and rudder pedals simulating those applied to corresponding controls of an actual aircraft. A plurality of further analog output signals represented by lines 25 are provided from computer 10 to drive various rotatable instruments via servomechanisms, and to drive meter movement types of instruments. Further output voltages represented by line 36 are provided to control the type and intensity of simulated radio signals some of which are generated by equipment outside computer 10. As mentioned above, a specific embodiment of computer 10 provides as many as 192 analog output signals and 256 Boolean output signals. The various simulated controls and indicating devices driven by the output signals from the computer are located so as to be visible by, or audible to, one or more members of the student crew, and, as will be understood by those skilled in the art, some, or all, of the various controls and indicating devices are additionally provided for one or more of the instructors to monitor.

Since the basic considerations inherent in the design and operation of flight simulators employing analog computers are well known in the prior art, and a primary feature of the present invention is the use of a novel and economical digital computer in a flight simulator, the computer itself is next described in detail in order that the invention may better be understood.

Referring now to FIG. 2, there is illustrated a simplified block diagram of computer 10. As there shown, the computer is composed of four major units which are:

(A) The general flight computer and the associated input-output apparatus,
(B) The linear interpolator,
(C) The radio aids computor, and
(D) The fast drum-load system.

The first three of the above listed units, and this is an important feature of the invention, run simultaneously when the system is in operation, and the fast drum load system is employed only for program and/or fixed data changes, as will be understood as the description proceeds. It should be noted that a major functional characteristic of computer 10 is the inclusion of extensive analog-to-digital and digital-to-analog conversion equipment, as well as a built-in function generation capacity that virtually doubles the effective overall computation speed. Further, since the program structure has been deliberately simplified, and the resultant specialized design materially simplifies the computer from a complexity-of-hardware standpoint, the computer is substantially superior for use in a flight simulator than a conventional general purpose computer.

Next, various of the subunits shown in FIG. 2 are first briefly described, prior to the detailed description of computer 10 which follows thereafter. As shown, computer 10, as do other binary computers, employs a conventional programmed arithmetic unit 38 and a small core memory 40 for working storage. Memory 40 consists of 2048 words, each of 23 binary bits plus sign. The information stored in the core memory is all numerical, that is, no program information is stored therein, but is instead obtained directly from a magnetic drum 42. The program is read and performed sequentially without the necessity for modification of the instructions through program arithmetic. The basic cycle time of the computer is 6.105 microseconds, with the result that new instructions are read at 6.105 microsecond intervals.

Analog input information is first applied along lines 18 to a multiplexer 44 and then to an analog-to-digital converter 46. The resultant converted information is then sequentially fed into assigned memory locations in core memory 40. Output information is handled in the reverse order, with numerical data from certain memory locations being sequentially transferred to a buffer core memory 48 and then to a digital-to-analog conveter 50, thereafter being routed to parallel analog output lines 35. This input-output technique allows the computer to be tied into conventional analog control loop systems, to accept input data ventional analog control loop systems, to accept input data for analog displays such as altimeter, airspeed, radar range, etc., all of which are common to simulation problems. Thus, as viewed through the input-output system, computer 10 appears similar to a large scale analog computer, accepting analog inputs and furnihsing analog outputs.

An important and unique part of computer 10 is the linear interpolator, shown as section B in FIG. 2. The arithmetic unit 52 associated with the interpolator section is 14 binary bits long, in contrast to the 23 bits-plus-sign of the main arithmetic unit 38. The linear interpolator operates in parallel with the main program, and generates functions of one or more variables by performing successive linear interpolations of data curves stored on drum 42. The program and dependent variable data are obtained from the drum, while the independent variable is obtained from core memory 40. Thus, the interpolator shares the main core memory with the rest of the system, and when a new interpolation result is obtained, the result is inserted in a pre-assigned memory location in the core memory, all as hereinafter more particularly described. Thus the result is available to the system programmer, who may utilize that result just as though it had been obtained from a sequence of operations of the main program. The interpolator program operates independently of the general flight program, and interpolator control 54 causes the system to perform its assigned sequence of interpolations of the stored functions. For a particular interpolation, the interpolator program contains the drum location of the sequence of ordinates of the break points of the curve which represents the dependent variable, the core memory address of the independent variable, and the core memory address at which the interpolated result is stored.

Drum 42 contains the programs for both the general purpose portion of the computer 10 and the linear interpolator, as well as the function information and various constants, in addition to the radio aids station data and several clock tracks. In this application, the drum is used in a read only mode, that is, during normal operation of the computer, no information is ever written onto the drum. The only time the drum is written upon occurs while the programs, function curves, and numerical constants are being stored. The write circuitry is then deactivated, and, in general, is physically removed from the computer, specifically to prevent accidental erasure of modification of the information stored on the drum.

Because of the fact that core memory 40 is shared between the general purpose section, the linear interpolator section, the radio aids section, and the input-output system, a scheme of priority determination is necessary to provide for core memory access so that all four systems may interrogate or write into the core memory when necessary, which scheme is effected by control unit 56 in conjunction with the general program control unit 55 and the clock control unit 57. Core memory access for interpolator, radio aids, and input-output purposes occurs during holes in the general purpose program. These "holes" exist because many operations of the general purpose programs do not require core memory access, and therefore, at the times these operations are being performed, the lower priority portions may obtain core memory access without interfering with the general purpose program.

It should now be pointed out that the Boolean information is also stored in core memory 40, in which 128 addressable word locations are reserved for this purpose. The Boolean input information bits supplied along lines 24 are first assembled into groups of 16 bits in Boolean input unit 58, and each of these groups is then sequentially fed into an assigned word location in core memory 40. Again, output information is handled in the reverse order, with the 16 binary data bits from certain memory locations being sequentially transferred to a Boolean output unit 60 wherein the 16 bit groups are disassembled and routed to the parallel Boolean output lines 30. As shown in FIG. 2, a further arithmetic unit 62, one bit long, is used to perform the Boolean functions of "and" and "or." This arithmetic unit allows computer 10 to do programmed arithmetic involving the many switching functions common to simulation problems. Boolean arithmetic unit 62 operates in conjunction with the reserved locations of core memory 40, which is capable of storing 2048 one-bit addressable words. This Boolean arithmetic capability allows the computer program to replace the relay logic of the conventional analog simulator, used for many accessory system and similar simulator functions.

Information regarding 350 radio stations of five different classes is stored on a separate band of drum 42 as shown in FIG. 2. A radio aids comparator 64 obtains information in digital form regarding the present position of the simulated aircraft and regarding the settings of all simulated radio receivers. This unit repeatedly examines the contents of the program memory radio data band and selects those radio stations which possibly may be received by the simulated receivers, and transfers complete information regarding each such preselected station from drum 42 to core memory 40. This preselected data is then further processed under program control of the general purpose section of computer 10, and the exact information, regarding each such station with regard to code patterns, signal strengths, exact range and bearing with reference to the simulated aircraft, etc., is transmitted along parallel lines 36 for use in external audio signal generators. Also stored in memory 40 is information relating the Call Letter Call Group pattern for each preselected station. A keying function generator unit 68 reads out this pattern for each such station in proper time sequence from memory 40, as will be understood as the description proceeds.

During the operation of loading and/or altering the data and instructions on magnetic drum 42, a portion of core memory 40 is used as a buffer, as is indicated by the duplicate block 40 positioned in section D of FIG. 2. During this time, data on paper tape is read by a reader 70 into fast drum-load control unit 72. Since, in general, the numerical information punched into the tape is in decimal form, control unit 72 first converts this data into binary digital form, assigns a predetermined address thereto, and delivers the data to 1024 word locations in core memory 40 in word-parallel form, wherein only 16 bits of each word is used. The data from the cores is then read onto the drum by drum write unit 74, one columnar position of the core memory being read serially from each of the 1024 core memory words into a given drum data track. Thus, 16 tracks are recorded from one loading of the core memory. After a group of 16 tracks is loaded, the data from the 16 drum tracks is read back in word parallel (one bit from each of the 16 tracks) and is compared with the corresponding 16-bit word in core memory 40. If the drum word is not identical, bit for bit, with its corresponding word from the core memory, the process is repeated. Further, the information read from the drum can, at this time, also be employed to operate an auxiliary paper tape punch 76 by means of readout control 78.

It should be noted, and this is an important feature of the computer portion of the present invention, that because all of the major types of operations required for simulation take place in parallel, without waiting for other types of operations to be completed, computer 10 may be extremely fast, and hence capable of solving aircraft dynamic calculations in real time at a rapid enough repetition rate to provide realistic simulation. Digital flight simulation apparatus of the prior art have tended to lump together all required calculations into a single extremely lengthy program, so that it has been difficult, if not impossible, to recalculate the entire program frequently enough to relastically simulate various rapidly-changing simulated aircraft parameters.

Figure 3:
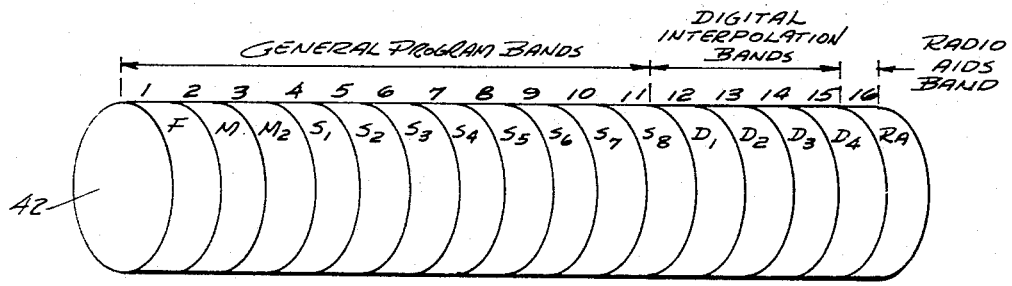
FIG. 3 illustrates the arrangement of the various data bands on the drum memory shown in block diagram of FIG. 2.

Continuing now with a more detailed description of computer 10, magnetic drum 42 is shown diagrammatically in FIG. 3 as containing 16 bands of instructions and constants, the conventional associated clock tracks being omitted for reasons of clarity. Once information has been written onto drum 42, the drum "write" circuitry is disconnected, and no further information can be written on the drum. This design deliberately prevents any further writing on the drum in order to avoid accidental modification of the instructions and constants stored on the drum. Once the general purpose section (section A of FIG. 2) of computer 10 selects a band of instructions to read, every word in that band is read in order, at the rate of one word every 6.105 microseconds, until all the words on that band have been read. At this time another band is selected and all of its words are read. As each word is read, the operation indicated by the word read is performed. If a given operation to be performed requires more than 6.105 microseconds to complete, then it is necessary to make one or more of the succeeding instructions "No Operation" instructions until enough time has been allowed for completion of the given operation.

The 16 bands on drum 42 are comprised of 240 data tracks, each track being one bit wide and 4096 bits in length around the circumference of the drum, and thus the drum total storage capacity exceeds 983,000 bits. Rotating at 2400 r.p.m., drum 42 requires 25 milliseconds to complete one revolution. All bits comprising a word are stored and read in parallel, i.e., if the first word in a band of the main program were being read, then the first bit in each of the 16 data tracks making up that band would be read simultaneously. All of the words in a band are read in one revolution of drum 200, and hence the read rate is approximately 164 kilocycles, or 6.105 microseconds per word. Drum 200 is equipped with 240 "write" heads (not shown) for the 240 tracks, and as mentioned above, once the drum has been loaded, before a simulated flight is started, all of the "write" heads are disconnected and thereafter remain disconnected throughout simulated flights, and until it is desired to simulate a modified or different aircraft, or perhaps to incorporate different radio station simulation. Drum 42 is also equipped with 240 conventional "read" heads for the 240 data tracks. The drum is driven in conventional fashion at constant speed by an accurate speed-controlled motor drive (indicated as 80 in FIG. 2) which is slaved to the power line frequency and hence operated from the same frequency standard as electric clocks. Inasmuch as such rotating magnetic drums and their associated read and write heads are well-known and commercially available, no detailed description of their structural details is necessary.

As indicated in FIG. 3, eleven of the 16 bands of words written around drum 42 are for the general program, four bands contain instructions and constants for the linear interpolator and one band is for radio aids simulation. Of the eleven bands reserved for the main program, one band F is called a "fast band," two bands $M_1$ and $M_2$ are called "medium" bands, and eight bands $S_1$ to $S_8$ are called "slow" bands.

All words in the 11-band general program portion of the drum are 16-bit words, and with 4096 words per band there will be seen to be a total word capacity of over 45,000 words in the general program portion of the drum. The four bands $D_1$ to $D_4$ of the digital function generator portion of the drum 42 are comprised of 11-bit words at 4096 words per band, representing a capacity of over 16,000 words. The 4096 words extending around the radio aids band RA are all 20-bit words. Each time drum 42 makes one revolution, three bands of instructions and constants are read simultaneously, one band of the eleven-band general program group being read, one band for the function generator, and the radio aids band, which latter band, RA, is read and performed on every revolution.

The 11 bands comprising the general program portion of the drum are not simply read in order 1 through 11, since some flight simulator quantities change much more rapidly than others and consequently require higher frequency response in the simulator for realistic real-time simulation. Those variables requiring a higher simulator frequency response must be recalculated more frequently than slowly changing variables. In the invention, in order to obtain sufficiently rapid calculation of rapidly-changing variables, without needlessly recalculating slowly changing variables at a needlessly fast rate, the variables are grouped between the "fast," "medium" and "slow" bands. The instructions for the calculation of those quantities requiring most frequent updating are contained on fast band F, and all the calculations on band F are performed on every other revolution of drum 42. The instructions of "medium" bands $M_1$ and $M_2$ are performed alternately on every fourth revolution of the drum. For example, first the instructions on the $M_1$ band are read and performed; then four revolutions later the instructions on the $M_2$ band; then four revolutions later the instructions on the $M_1$ band, etc. The eight remaining bands $S_1$ to $S_8$, designated "slow" bands, are read and their instructions performed one at a time on every fourth revolution of the drum until all eight have been read, after which the process is repeated. It will be seen from the above that all instructions on fast band F are performed every 50 milliseconds, those on the medium bands every 200 milliseconds, and those on the slow bands every 0.8 second.

Figure 4:
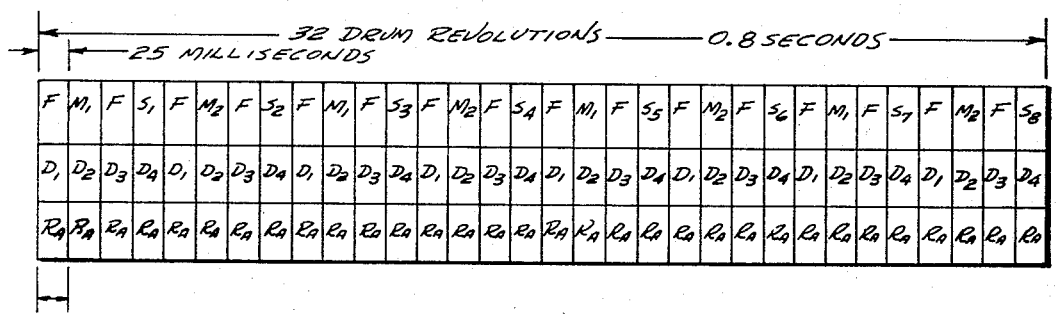
FIG. 4 is a timing diagram showing the order in which the various data bands shown in FIG. 3 are read.

As stated previously, two other bands on the drum are being read simultaneously each time a band of the general program is read during a given drum revolution, one being radio aids instruction band RA, which is read on every drum revolution, and the other being one of the four "D" bands used to control linear interpolator function generation. The four interpolator bands $D_1$ to $D_4$ are read one after the other at the rate of one band per drum revolution, so that any given one of the "D" bands is read once every fourth revolution of the drum. The read order of magnetic drum 42 is illustrated diagrammatically in FIG. 4 for 43 complete revolutions of the drum, after which all of the bands on the drum will have been read at least once. The top row of blocks in FIG. 4 represents the general program bands (F, $M_1$, $M_2$ and $S_1$ to $S_8$), the second row represents the digital function generator bands ($D_1$ to $D_4$) and the lower row represents the radio aids band RA. Each vertical column in FIG. 4 represents one drum revolution (25 milliseconds), and after 32 revolutions (0.8 second) all of the bands have been read in the order indicated.

Core memory 40 of computer 10 is a 2048-word, random-access memory, with each of its 2048 words stored in an addressable location. Numerical information may be stored in any word location, or, conversely, the information contained in any word location may be read out on command. Only one word location in core memory 40 can be read out of or written into during a single machine operation cycle (6.105 microseconds). Each word of the main core memory is 24 bits long, of which the most significant bit is the sign bit. Main core memory 40 functions as the working storage of computer 10, and all quantities stored in this memory are frequently changed, updated, and erased.

The variables in the simulator equations are assigned individual locations in memory 40, and as each of these variables is recalculated or changed, its new value is inserted into the proper core location, thus replacing the previously-stored value. All input signals to computer 10, including, for example, those from the student-operated controls and the instructor-operated controls, are routed to preassigned storage locations in memory 40, as mentioned above in connection with FIG. 2, and all output signals from computer 10 to the rest of the simulator system are read out from their preassigned storage locations in the main core memory. Independent variables to be used by linear interpolator arithmetic unit 52 are also read from their assigned locations in core memory 40 and similarly, computed function values are stored in assigned core locations by unit 52. Thus it will be seen, that the mathematical quantities needed to represent all the conditions of simulated flight at a given instant are stored in core memory 40, with the exception of constants, such as for example, gravitational acceleration which constants may be stored on drum 42.

As mentioned above, only one word of the entire core memory may be interrogated or written in during a single 6.105 microsecond machine cycle time. Realistic simulation requires, however, that many computer processes operate in parallel time, and the process of function generation, radio preselection, input-output reading and main program arithmetic all require memory access. Therefore, in the invention the various processes are given priority ratings. Operations of the main program requiring memory access are given absolute top priority, and hence execution of the main program is never delayed to allow access to memory 40 by the function interpolator, the radio aids comparator, or any of the input or output equipment. Operations or instructions in the main program that do not require memory access are considered to be "holes" in the main program, and during such "holes" the auxiliary processes of computer 10 gain access to core memory 40, which is an important feature of the present invention contributing significantly to its excellent dynamic response. Instructions in the main program such as "Scale," "Shift," "Take Absolute Value," "Invert," "Zero Slice," "Flag" and "No Operation," none of which require memory access, act as "holes" to auxiliary sections of computer 10. In the preferred embodiment of the invention the following priority schedule is established:

(1) Main Program
(2) Digital function interpolation
(3) Radio aids comparison and preselection
(4) Analog input scanning
(5) Analog output reading (via buffer memory 48)
(6) Boolean input scanning
(7) Boolean output reading The reasons for this order of priority will become apparent as the description proceeds and the various operations are discussed in detail.

Figure 5:
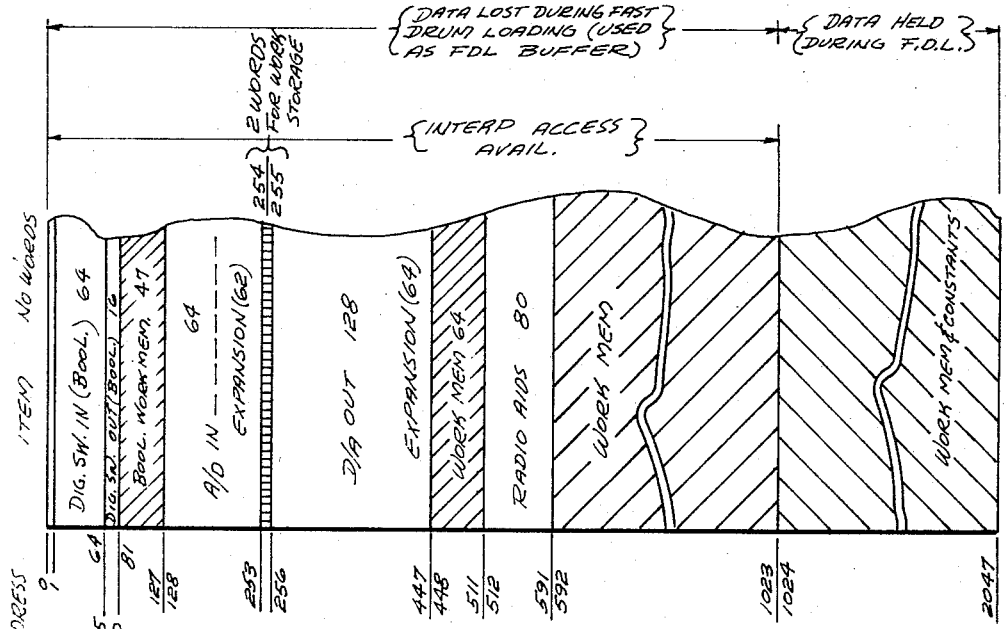
FIG. 5 represents the address assignments of the core memory shown in the block diagram of FIG. 2.

A typical allocation of the 2048 word locations of core memory 40 is illustrated in FIG. 5. As there shown, address zero is indicated as being left unused. This results from the fact that address zero is an indication code in various of the program instruction words, and for this reason no word location is normally identified with this address. Thus, the 2048 word locations are indexed by addresses numbered 1 through 2047, rather than by addresses 0 through 2047. The first 127 word locations are reserved as Boolean storage locations, and, as has been pointed out above, only the first 16 bits of each word location is used for Boolean data storage, core memory 40, therefore, is operative to store 2032 bits of Boolean information, since each Boolean word is only one bit long. Alternatively, if desired, address 0 could be rendered addressable to thereby store 2048 bits of Boolean information, but as will be understood as the description proceeds, it is preferable to retain address 0 as an identification code. Further, word addresses 1 through 64 accept the Boolean input data from Boolean input unit 58 and addresses 65 through 80 provide Boolean output data to Boolean output unit 60, with addresses 81 through 127 functioning as the Boolean working memory. Continuing, addresses 128 through 253 are assigned to accept the converted analog data from converter 46 and addresses 256 through 447 provide digital readout data to buffer 48, with addresses 254 and 255 functioning as a portion of the general purpose working memory. Additionally, addresses 448 through 511 and 592 through 2047 also function as part of the general purpose working memory. Finally addresses 512 through 591 are provided for storing radio aids information. Since all of addresses of core memory 40 are actually locations of a single conventional random access memory unit, word instructions requiring access to this memory may be either Boolean or arithmetic, that is, multi-bit. Therefore, any instruction of the main general purpose program that requires access to core memory 40, whether arithmetic or Boolean, represents an operation of the highest priority.

Because the 128 word Boolean section of memory 40 actually comprises a part of main core memory 40, it is possible to program this memory by addressing all 16 bit positions of one or more of these 127 words with an ordinary, non-Boolean, or arithmetic, instruction. This may be done if it is desired to provide a direct 16-bit binary output of an ordinary arithmetic quantity without the necessity of routing the output through buffer core memory 48 and digital-to-analog converter 50 (FIG. 2). Similarly, if desired, one or more words of the 128-word Boolean section of the core memory may be programmed to store an externally coded, 16-bit binary word as an input, thereby avoiding the necessity of routing these inputs through analog-to-digital converter and multiplexer 44.

It is important to note, if the above practices are employed for the purpose of providing direct binary inputs and outputs of ordinary arithmetic quantities, that the programmer consider the entire Boolean storage to be reduced in size, and never address the bits concerned for any Boolean purpose.

The main arithmetic unit 38 of computer 10 acts as the operating center of the computer. Unit 38 includes a 24-bit accumulator register for holding the numerical results of arithmetic operations, all the necessary logic circuitry for performing arithmetic operations and transferring numerical data, and a salvage register that salvages the old contents of the accumulator when a new word is loaded into the accumulator. At the beginning of each arithmetic operation, one of the two operands associated with that particular instruction is stored in the accumulator, addressable register. The other operand is in a location in core memory 40. The command portion of the instruction causes the arithmetic unit to perform a specific operation upon the number held in the accumulator and the number obtained in the core memory address specified by the address portion of the instruction. At the conclusion of each instruction cycle, the results of that operation remain in the accumulator of the arithmetic unit, and the resulting contents of the accumulator are then operated upon according to the next instruction word.

All numerical operations in the main arithmetic unit are of the fixed-point binary form. All numbers handled by unit 38, either as inputs to or results of arithmetic operations, are in the form of an absolute value and sign. Sign processes are performed in all arithmetic operations, and signs are preserved in the results. All number words are 24 bits in length, the first bit being the algebraic sign, and the remaining 23 bits being the absolute value of the binary number. If the sign bit is zero the number is positive, and conversely, if the sign bit is one, the number is negative. Thus a typical numerical word in computer 20 might be represented as follows:

0 01101011100101010111001
sign bit    23 magnitude bits

In the fixed point arithmetic used in the specific embodiment here being described, the decimal point is assumed to be to the left of the most significant bit, and therefore the magnitude of a number is always less than unity. Thus, the largest magnitude that may be represented is 0.99999----------, in decimal notation, or .1111111-------- in binary notation. All numbers handled in the computer must be scaled with the fixed-point notation in mind, of course.

If the result of any arithmetic operation in the computer provides a number greater than |.111111111-----|, an automatic overflow process sets each bit of the number to "1" but preserves the sign of the result. Thus after an overflow caused by a positive result greater than one, the contents of the accumulator will be as follows:

0  11111111111111111111111

An automatic overflow is possible in the execution of any of the following instructions: Add, Subtract, Divide or Scale.

The conventional rules for addition in the binary system are employed as follows:

$0+0=0$
$1+0=1$
$1+1=10$ (zero with 1 carried)

As an example of binary addition, the sum of two numbers 1011001 and 1001010 is:

```
  1011000 carries
  1011001 augend
 +1001010 addend
  -------
 10110011 sum
```

Addition in the computer is accomplished by a parallel adder having fast carry propagation. Consider the two binary numbers A and B:

$$A = 0 \underset{A_n}{-} \underset{\cdots}{-} \underset{A_2}{1} \underset{A_1}{1} \underset{A_0}{1}$$
$$B = 0 \underset{B_n}{-} \underset{\cdots}{-} \underset{B_2}{0} \underset{B_1}{1} \underset{B_0}{1}$$

In the parallel adder the addition of corresponding bits between two numbers is done simultaneously. That is, in the example given, the $A_0$ digit is being added to the $B_0$ digit at the same time that the $A_1$ and $B_1$ digits are being added. Carries, of course, must be considered. When adding the two least significant digits ($A_0$ and $B_0$), there is obviously no carry from the right, and the results of adding $A_0$ and $B_0$ thus may be described by the following "truth" table:

| $A_0$ | $B_0$ | $C_{out}$ | Sum |
|---|---|---|---|
| 1 | 0 | 0 | 1 |
| 1 | 1 | 1 | 0 |
| 0 | 0 | 0 | 0 |
| 0 | 1 | 0 | 1 |

The truth table shows that the sum of $A_0$ and $B_0$ is one if $A_0$ and $B_0$ are complementary. $C_{out}$ denotes carries to the left, i.e., to the next succeeding higher order pair of digits, $A_1$ and $B_1$. If $A_0$ and $B_0$ are both zero, then the sum is zero and there is no carry. If $A_0$ and $B_0$ are both one, the sum is zero and a "1" is carried.

The summing of any higher order pairs of digits is made more complicated by the fact that carries from the right must be considered. The following further truth table is perfectly general in that it represents the sum of any two corresponding bits of any two binary numbers.

| A | B | $C_{in}$ | $C_{out}$ | Sum |
|---|---|---|---|---|
| 0 | 0 | 0 | 0 | 0 |
| 0 | 0 | 1 | 0 | 1 |
| 1 | 1 | 0 | 1 | 0 |
| 1 | 1 | 1 | 1 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |

In this table it will be seen that the sum S and carry-out $C_{out}$ now are determined by the binary addition of three quantities, A, B and $C_{in}$. Using Boolean notation, S and $C_{out}$ can each be defined by an equation written in terms of A, B and $C_{in}$. If these two equations are implemented for each pair of corresponding digits of the binary numbers A and B, the resultant system represents a complete parallel binary adder.

About 70% of the instructions used in computer 10, including, for example, such instructions as Add, Subtract and Multiply, cause some operation to be performed on the numerical data contained in the arithmetic accumulator. It should be noted that only numerical data is ever inserted into the accumulator, as instructions are found only on magnetic drum 42, and the instructions are never operated on or modified during operation of the computer. The first bit of the accumulator is reserved as the sign bit, which gives the algebraic sign of the number defined by the remaining 23 bits.

Numerical data may be loaded into the accumulator from the core memory, and, by virtue of a special instruction, from the drum. Data contained in the accumulator may be stored only in the core memory. Most operations performed on data in the accumulator require only a very small amount of time and may be initiated and finished in the amount of time equal to one machine operation cycle (6.105 microseconds). A few of the operations, such as Multiply and Divide, require several machine cycles to complete, and therefore, once they are initiated, care must be taken to insure that new instructions do not arrive requiring operations on data in the accumulator until the previous, more lengthy operation has been completed, as will be discussed below in greater detail.

Associated with the arithmetic accumulator in the main arithmetic unit 37 is a salvage register, also 24 bits in length. When an instruction is read directing that a word of data from some source be loaded into the accumulator, if there were no salvage register whatever word happens to be in the accumulator at that time would be lost when the new words were loaded. The function of the salvage register, as its name implies, is to salvage the data word in the accumulator just prior to a "Load" instruction. Thus, if the number X is present in the accumulator at the time that an instruction is read directing that Y be loaded into the accumulator, then one machine cycle later Y will appear in the accumulator and X will appear in the salvage register, and the previous contents of the salvage register will be lost. The salvage register, having the address 0000, is a flip-flop type register, and because the "old" contents of the accumulator would otherwise be lost when the "new" contents are inserted upon execution of the load command, and because appreciable time is saved when performing sequences of operation of the form $S = AB + CD + EF + \ldots$, it is convenient to "salvage" the contents of the accumulator between the load accumulator instructions. A typical program sequence of this operation is as follows:

(1) Load accumulator with (address of A)
(2) Multiply by (address of B)
(3) Load accumulator with (address of C)

Note that at this time C is now in the accumulator and the product AB has been shifted to the salvage register.

(4) Multiply by (address of D)
(5) Add (address 0000)

Note that this operation adds to the accumulator product CD the product AB held in the salvage register, leaving AB+CD in the accumulator.

(6) Load accumulator (address of E)
(7) Multiply by (address of F)
(8) Add (address 0000)

At this time AB+CD+EF is in the accumulator.

In each operation wherein a load accumulator instruction is performed, an operation is gained because it is not necessary to store away in some memory location the intermediate products AB, CD, and EF. Furthermore, each time the "add address 0000" instruction is executed a memory access cycle is saved. Along with this is the less obvious saving in the number of word locations required, since having the salvage register renders it unnecessary to provide preassigned storage locations for each of the partial products. Examination of the equations typical of flight simulation reveals that many of them are of the form AB+CD+EF+ . . . , so that a substantial saving of program steps is effected.

The Boolean arithmetic unit 62 is the Boolean counterpart of main arithmetic unit 38. Arithmetic unit 62 performs all Boolean operations indicated by instructions in the general program. The logic circuitry of unit 62 is arranged to perform the functions of AND, OR, COMPLEMENT, LOAD and STORE. Like main arithmetic unit 38, Boolean arithmetic unit 62 has an accumulator and a salvage register. Since Boolean words are one bit in length, the Boolean accumulator, which is used to hold the results of all Boolean operations, is a 1-bit register. Boolean words may be loaded into the Boolean accumulator from core memory 40, and information in the Boolean accumulator may be stored in memory locations in the 127-word Boolean portion of main core memory 40. All Boolean operations, indicated by instructions in the general program on drum 42, are performed on the contents of the Boolean accumulator by the contents of the address specified in the instruction.

The Boolean salvage register performs the same function as the salvage register of the main arithmetic unit, i.e., to salvage the previous contents of the accumulator when a new word is loaded. However, unlike the main arithmetic salvage register, which is only a one-word register, the Boolean salvage register is designed to hold four 1-bit words, all of which are addressable. Because of this multiword capacity, the Boolean salvage register may act as an intermediate, temporary storage unit, thus reducing the core memory access requirements of Boolean arithmetic unit 62.

The operation of the Boolean salvage unit may be better understood by reference to FIG. 6, which diagrammatically shows a typical series of "Load" instructions. It will be seen that as new accumulator contents arrive, the previous accumulator contents are shifted into, through, and out of the Boolean unit salvage register. Since the four words of the Boolean salvage register are addressable locations, the contents of any of these word locations may be used to perform a logical "AND" or "OR" with the contents of the Boolean accumulator.

Each radio transmitter located anywhere in the world causes a signal to be induced into the antenna of every receiver in the world. Obviously the signals induced into a given receiver by very distant transmitters are extremely weak and cannot be heard because of the noise level, while others are intentionally rejected by frequency selective circuits in the receiver. Navigation transmitters which occupy the same frequency band are particularly and deliberately separated by large distances, or reduced in power, or confined to selected radiation patterns, to prevent interference. These facts make it possible to devise an automatic radio navigation simulation system, which, on the basis of simulated receiver frequency and simulated aircraft location, can select for each receiver to be simulated, the one best transmitting facility to receive. Radio aids comparator unit 64 examines a total of 350 different radio transmitters and selects the one transmitter, if any, that each of the simulated aircraft receivers should be picking up. Unit 64 operates in parallel with the general program of computer 10, thereby not subtracting time from aircraft dynamic calculations, and being completely automatic, it requires no programmer's attention.

In the radio aids portion of the invention, the information required for the simulation of 350 navigation transmitters is contained in 20 data tracks in band RA (see FIG. 3) of magnetic drum 42. The 20 tracks are independent of those tracks used for the main program and for function generation, but, like all tracks on the drum 42 they are only read and not rewritten during flight simulation. Data may be loaded into the 20 tracks by means of drum write unit 74, to enter a new set of 350 different facilities, in about a minute's time, if, in between two simulated flights, such a new set of 350 stations are desired for simulation.

In most analog computers simulation of an ILS installation is accomplished by computing the aircraft distance and direction from a single reference point and by modifying the computed distance and direction to determine the separate locations and distances of the localizer transmitter, the high frequency marker transmitters and any low-frequency compass-marker transmitters. In the invention, on the other hand, each transmitter is treated as a separate entity, except that glideslope facilities are treated as components of their associated localizer transmitter, and DMET systems are considered as an integral part of their associated azimuth transmitter systems. Otherwise, each separate transmitter, such as a Z-marker transmitter, or an A–N range fan marker transmitter is treated as a separate transmitter.

The 350 available simulated transmitters are divided into five different types. The maximum number of facilities provided for any given type may not be exceeded, although it is not necessary that all the facilities of a given type be used if use of a smaller number is deemed desirable. Type I, designated "low frequency transmitters" includes low-frequency beacons, low-frequency compass locator facilities, and A/N range stations. In the invention 127 such facilities can be represented, of which as many as 32 may be A/N range stations, although less than 32 such range stations may be simulated if desired. Type II, designated "VHF/UHF transmission facilities" includes VOR transmitters, tacan transmitters, Navy UHF direction-finder transmitters, and ILS transmitters. A total of 127 independent VHF/UHF transmitters can be represented. Type III includes "Outer ILS markers," of which 32 can be represented. Type IV includes "Middle ILS markers," of which 32 can also be simulated. Type V includes "Fan and Z markers," 32 of which may be provided, mixed in any desired proportion. Any one of the facilities can be received when the simulated aircraft is within range of the transmission facility and if the appropriate simulated receivers are operative and tuned properly. The computer ordinarily does not automatically provide the voice signals associated with certain facilities and a microphone is provided for an instructor to supply appropriate voice signals. Call letter identification signals are provided automatically, however.

Facility selection is based upon electronic inspection of the data words provided for each of the facilities. Comparator unit 64 employs special electronic circuitry to scan the drum data concerning the 350 individual navigational transmitters and select the one, if any, eligible transmitter facility to be received by each navigation receiver in the simulated aircraft. Since all 350 facilities are scanned once every drum revolution (40 times per second), a fast and simple system is employed to select the one best facility from each group that best merits simulation, and it transfers data to core memory 40 for the programmed computation associated with each receiver.

While a criterion such as slant range between the simulated aircraft and a simulated station might appear desirable for comparison purposes, and while it is possible to compute such a quantity, such a computation involves several subtractions, additions, multiplications and a square root operation, and is deemed too complicated to be accomplished in the time available for comparison, and therefore in the invention, the criteria used for comparison are station, frequency, station X coordinate, and station Y coordinate, both coordinates being relative to the simulated aircraft instantaneous location.

Fan, Z, middle and outer markers all operate on 75 megacycles and are received by fixed frequency untunable receivers in the aircraft. Accordingly, comparison of facility types III, IV and V is done solely on the basis of geographical location of the facility with respect to the simulated aircraft position. On the other hand, low-frequency navigation receivers, such as automatic direction finders, commonly employed continuous tuning, and a student may mis-tune to such a station in varying degrees. Accordingly, the use of frequency in the comparison of low-frequency facilities allows a "band" of frequencies somewhat wider than the bandpass of the receiver being simulated, with a final determination of the "degree of tune" being performed by programmed computation after a station is selected. VHF/UHF navigational facilities are ordinarily tuned by receivers employing discrete numerical switching for frequency selection, with the result that comparison may employ the exact frequency of the facility rather than an allowable band of facilities, and hence the final decision whether a simulated VHF facility is tuned can be based exclusively upon the action of the radio aids comparator 64.

Inspection of facility frequency will be seen to depend upon receiver tuning and facility frequency characteristics. The criterion against which facility frequency acceptability is judged is the degree of match between the frequency to which the simulated receiver is tuned and the assigned frequency of the transmitter facility. In order for a simulated transmitter facility to be "heard," it is necessary that its frequency match the receiver frequency within certain limits. These limits actually correspond to the bandwidth of the receiver, but the electronic inspection system of the invention operates as if the limits are assigned to the transmitter facility, to provide the same end result with the same degree of match, but in a simplified and more economical manner. For each of the transmitters simulated in computer 10, an upper and lower frequency limit is assigned. Comparator 64 will find a particular facility acceptable for a particular receiver from a frequency standpoint, if, and only if, the frequency of the receiver falls between the lower and upper frequency limits assigned to that facility. Because, as mentioned above, all marker transmitters operate on the same frequency (75 megacycles), frequency is not a criterion required to determine whether a marker transmitter can be received. In the invention, however, circuit design is simplified by actually inspecting the frequency of marker transmitters, and by setting the upper and lower frequency limits of the marker transmitters so wide that every transmitter will pass irrespective of frequency. As VHF/UHF receivers employ digital tuning with discrete frequencies, the limits assigned to the transmitter may be quite close together, ensuring that only those simulated transmitters which exactly match the receiver's frequency will pass the frequency test for a given receiver. Low-frequency transmitter facilities are assigned frequency limits in the invention by subtracting and adding, to the assigned operating frequency, a number that is somewhat greater than half the receiver bandwidth. The resulting two numbers are then used as the lower and upper frequency limits. LF transmitters will pass the frequency test only if the instantaneous receiver frequency falls between the lower and upper frequency limits assigned to that transmitter.

As mentioned above, in addition to consideration of frequency assignment, it is necessary to consider the location of the simulated aircraft with respect to the station, and in the interests of avoiding complexity, computation of slant range is not performed. In the invention, the method employed for geographic inspection assigns two pairs of coordinates to each of the 350 transmitter facilities. These coordinate pairs represent the upper, lower, left and right boundaries of a rectangle that contains a given facility. The rectangles are arbitrarily assigned so that the left and right boundaries are in the east-west direction (X axis) and the upper and lower boundaries are in the north-south direction (Y axis). In general, each rectangle is made as large as possible, using caution that there are no overlaps of rectangles assigned to different facilities either operating on the same frequency in the case of markers and VHF/UHF facilities, or operating on closely adjacent frequencies that could be within the bandpass of the receiver in the case of LF facilities.

The assignment of rectangles to each facility is made easier by the facility grouping in the computer memory drum 42. For example, there are three groups of markers, outer ILS, inner ILS, and fan or Z markers. Although all three groups operate on the same frequency, only one marker transmitted from each group can be selected at one time. Therefore, it is only necessary to assign the rectangles in such a manner that for a given group, such as outer ILS markers, overlapping rectangles are not assigned. The rectangles assigned to facilities of different groups can be permitted to overlap without causing interference. Because of the programmed calculations involving the range and radiation pattern, no interference will result unless two or more markers of the different types represented in reality do interfere and can be simultaneously received.

The radio pre-select system transfers to core memory four call-letter words for each facility pre-selected except middle markers or outer markers. Thus, four 20-bit call-letter words are transferred for each of four VHF receivers, two LF receivers, and the fan/Z marker group. Although 20-bit call-letter words are actually transferred to the core memory, all useful information is contained in the most significant 16 bits. Accordingly, the call letter information is contained in 64 bits, each bit representing a key UP or key DOWN command for a fixed time interval of 0.1 second (in this respect the 64 successive commands are similar to 64 time intervals along the length of a Morse code practice tape.)

The call letter code words are retrieved from core memory for call letter generation through the use of the circuitry employed to obtain a single bit from a 16-bit word in the Boolean memory section of the computer. At 0.1 second cyclic intervals, the computer automatically interrogates the core memory for the seven receiver facilities embracing stored call letters (that is, four VHF receivers, two LF receivers, and the fan/Z marker facility). A single bit of the combined 64-bit call is interrogated for each of the seven facilities at each 0.1 second interval. That is, at a particular interval, the 39th bit of all seven facilities is interrogated, the 39th bit being the seventh bit of the third word. At the next 0.1 cycle interval, the 40th bit of all seven is interrogated and so on through the end of the cycle, at which point the process repeats beginning with the number one bits. Thus at any instant, seven outputs are available representing the key UP, key DOWN, command for the seven facilities, a digital circuitry output of one representing key DOWN.

VHF receiver #1
VHF receiver #2
VHF receiver #3
VHF receiver #4
Fan/Z marker
LF receiver #1    A-channel
LF receiver #1    N-channel
LF receiver #2    A-channel
LF receiver #2    N-channel
Middle marker
Outer marker
VORTAC cycle control The system of generating A–N range employs a servo which is controlled through internal computation, the shaft position of the servo being such that the mathematically rigorous A–N signal ratio is obtained from the wiper of a potentiometer whose lower end is connected to an A call letter signal and whose upper end is connected to an N call letter generator. Under this system, zero rotation of the control servo generates pure A and full rotation pure N, while half rotation generates on-course. The four low-frequency receiver keying output channels provide A and N keying information for low-frequency receivers 1 and 2 respectively. The associated A and N call letters as keyed through information obtained from the radio aids computer are permanently connected as audio excitation to the respective ends of the potentiometers on the two A–N ratio control servos. The logical design of the keyer circuitry is such that, in the event of reception of a non-A–N facility, both the A and the N line receive call letters simultaneously. Accordingly, the conventional low frequency non-directional beacon call letter signals are generated at equal volume regardless of the A–N ratio servo position, since both ends of the potentiometer will receive equal signals. Therefore, in the event of reception of a non-A–N facility it is unnecessary to reposition the A–N control ratio servos. The A–N/call letter interlace pattern is automatically provided.

The VORTAC cycle control is one for five major call letter cycles (32 seconds) and zero for the next 6.4 seconds. This information, while not precisely correct from a timing standpoint, is employed to control the missing call letter groups of a VORTAC facility and the infrequent call letter generations of a DMET facility.

In summary, comparison in order to select one of the radio facilities within a group is accomplished by determining whether the aircraft is within a pair of left and right X coordinate bounds and a pair of upper and lower Y coordinate bounds, and whether the receiver is turned to a frequency within a pair of upper and lower frequency bounds. Each transmitter may be visualized as being effectively placed within a rectangular box having north-south and east-west boundaries. The box cannot be placed diagonally on a map. The third dimension of the box is, of course, frequency rather than altitude, but the three-dimensional concept is convenient for visualizing the physical domain within which the individual transmitters are eligible for reception. If the boxes of a given facility type are all independent of one another, i.e., if none of them share a common space, it is apparent that no more than one transmitter of a given group will be considered eligible for reception. It also should be apparent that it will be possible to operate in a space that is free of any of the individual boxes, in which case no simulated station may be received. This situation is, of course, immediately altered if the receiver tuning is changed, since this constitutes a change in the vertical dimension of the imaginary three-dimensional space, which may result in the selection of a station whose imaginary box has been entered.

When any station of a particular group simultaneously meets all three preselected criteria, the stored data describing that station are transferred from drum 42 to a specific group of core memory locations in core memory 40, specific groups of core memory locations being associated with individual of the simulated receivers capable of receiving that station. The transferred data are used to calculate signal strength, range leg orientation, beam pattern, and call letters, in accordance with the type of facility.

As mentioned above generation of the numerous arbitrary engine and aerodynamic functions required for flight simulation is done continuously in parallel with execution of the main arithmetic program of computer 10, and the resulting savings in main computation program time contributes largely to the real-time dynamic response of computer 10. Function generation is accomplished by means of linear interpolation between the ordinates of fixed breakpoints. In FIG. 7 an illustrative arbitrary function of X is shown, with the X axis divided into eight equal segments defined by nine breakpoints: 0, ⅛, ¼, ⅜, ½, ⅝, ¾, ⅞, and 1. If the ordinates of these nine breakpoints are known and if the independent variable X is shown, then it is possible to perform a linear interpolation to determine $f(X)$ at any value of X. For example, if X lies between ⅛ and ¼, it is possible to interpolate between $f_{(1/8)} X$ and $f_{(1/4)} X$ to obtain a very close approximation of $f(X)$. The linear interpolator unit 52 has its own arithmetic unit equipped with a parallel binary adder and appropriate registers and logic circuitry to solve the linear interpolation formula for $f(X)$.

Figure 8:
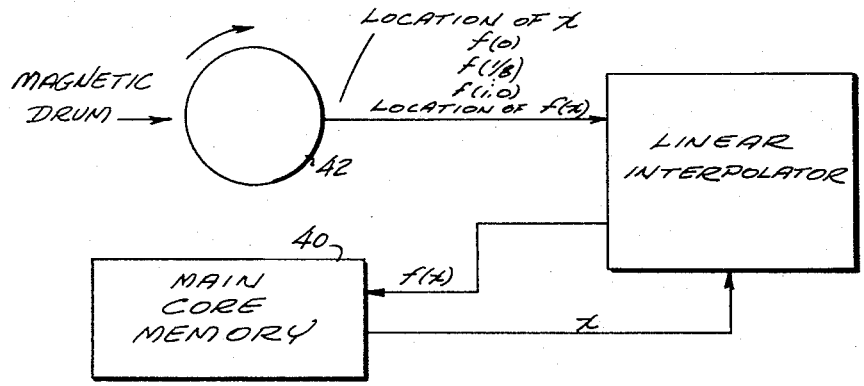
FIG. 8 is a flow diagram illustrating the operation of the linear function interpolator shown in the block diagram of FIG. 2.

As stated previously, all numbers to be handled by computer 10 must be scaled so that their magnitude is not greater than one, and function interpolator 52 numbers are no exception. Therefore, both the independent variable X and the ordinate value $f(X)$ must be scaled so that their magnitudes are always less than one. Further, it is also assumed that all numbers to be handled are positive in sign. The four bands $D_1$ to $D_4$ on drum 42, used for function interpolation, store the breakpoint ordinates of all the function curves. Also stored on drum 42 are the core memory locations of the independent variable and the core memory location in which the calculated value of the function will be stored. Each different function is represented by its own block of information listed on one of the bands $D_1$ to $D_4$, all of the blocks being listed in order around the bands. FIG. 8 diagrammatically illustrates the flow of information for function generation.

Since the X values of the breakpoints of different functions are fixed to be the same, at 0, ⅛, ¼, ⅜, etc., these values need not be stored. It is only necessary that the logic of the interpolator be capable upon receipt of a given value of X, to look at the value of X and recognize which two breakpoints it lies between. For example, assume the binary representation of the X values of the fixed breakpoints to be as follows:

0 = .000000000 . . .
⅛ = .001000000 . . .
¼ = .010000000 . . .
⅜ = .011000000 . . .
½ = .100000000 . . .
⅝ = .101000000 . . .
¾ = .110000000 . . .
⅞ = .111000000 . . .
1 = .111111111 . . .

It will be apparent from such a representation that the first three digits of X will determine which two breakpoints X lies between, in accordance with the following scheme:

| 000 | 001 | 010 | 011 | 100 | 101 | 110 | 111 |
|---|---|---|---|---|---|---|---|
| 0 | ⅛ | ¼ | ⅜ | ½ | ⅝ | ¾ | ⅞ 1 |

Figure 9:
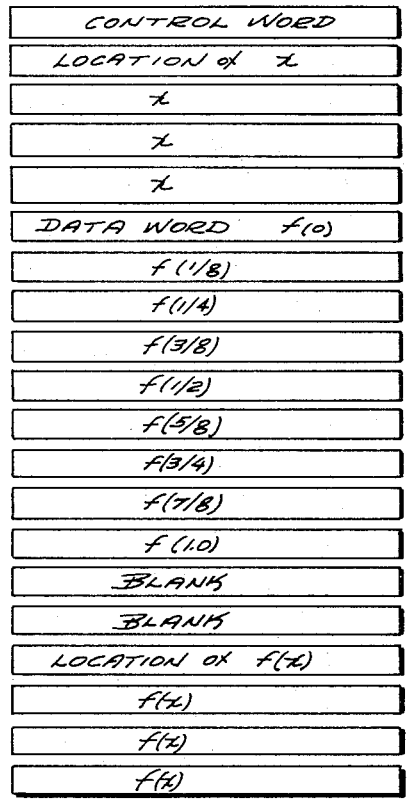
FIG. 9 illustrates a typical instruction sequence for the linear function interpolator shown in the block diagram of FIG. 2.

Assuming a function $f(X)$ of single variable X, the block of words stored on drum 42 concerning the function comprises (1) a control word which identifies the function and indicates whether it is a function of one, two or three variables, (2) a second word specifying the memory location of the independent variable, and (3) the ordinates of the nine breakpoints, in order, beginning with $f(0)$, as shown in FIG. 9. It may be noted that the memory location of X, the independent variable, is listed before the ordinate information. It will be recalled that memory access by the main program has priority over access requirements by interpolator control 54 and hence control 54 may have access to core memory 40 only during "holes" in the main program. To insure that the current value of the independent variable is obtained from its memory location, its address must be repeated several times. Thus the first time the address of X is read from drum 42, control 54 will attempt to interrogate core memory 40. If it fails to do so during a read cycle (6.105 microseconds), another word will be read from drum 42 directing it to interrogate memory 40 again. By repeating this process a sufficient number of times, the probability of encountering a "hole" in the main program, and thereby gaining access to core memory 40, can be increased to a point where access is practically insured. In most cases, repeating the location of the independent variable four or five times will prove to be sufficient.

Once access to core memory 40 is gained, the current value of the independent variable is read into a register in interpolator arithmetic unit 52. Here, as stated previously, the first three digits of X (the independent variable) are examined to bracket X between two breakpoints. This process is finished before the data field is read, and therefore, before the first ordinate is read arithmetic unit 52 already knows which two breakpoints bracket, or bound, the instantaneous value of the independent variable X. As the nine ordinates are read from drum 42, only the two bracketing ordinates are held for interpolation and the other ordinate words are ignored by arithmetic unit 52.

The result of the interpolation is, of course, a binary number specifying $f(X)$. This numerical value is held in the linear interpolator arithmetic unit until a word is read from drum 42 directing that $f(X)$ be stored and specifying the location in the core memory in which it should be stored. As before, when the location of X was repeated several times to ensure memory access during a hole in the main program, four or five repetitions of the location of $f(X)$ are provided to ensure access to memory 40 in order to store $f(X)$ during another "hole" in the main program.

It will be seen that if the instantaneous value of X lies between the 7/8 and 1.0, the last segment of the function, arithmetic unit 52 has to wait until the eighth and ninth ordinates of the function are read from the drum before beginning its calculations, and hence some time must be allowed after the last ordinate is listed before the memory location of $f(X)$ is listed. This time allows the interpolator to finish its calculating before being directed to store the results. In the case of a single variable function, two blank words (approximately 12 microseconds) are sufficient time, as shown in FIG. 9. In the case of a function of two variables four blanks are required, and for a function of three variables six blanks are required.

Figure 10:
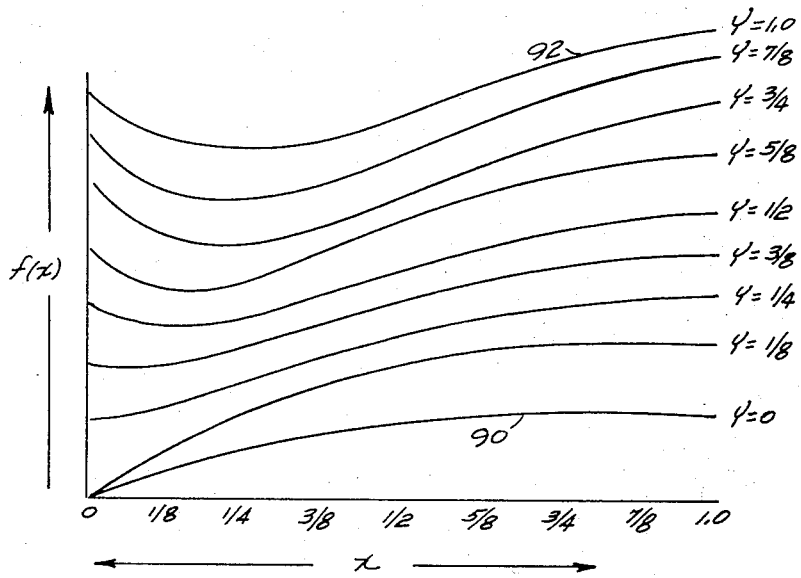
FIG. 10 illustrates an arbitrary function of two variables as a family of curves useful in explaining the operation of the linear function interpolator shown in the block diagram of FIG. 2.

A function of two independent variables (X, Y) may be represented by a family of nine single-variable functions, as shown in FIG. 10. Examination of FIG. 10 shows that (9×9) or 81 ordinates are required to describe this function. The address of Y is listed after listing the address of X, and the Y address also must be repeated several times to ensure memory access during a "hole" in the main program. Then 81 data points are listed in order, beginning with the $f(X, Y=0)$ curve, curve 90 of FIG. 9, and ending with the $f(X, Y=1.0)$ curve, curve 92 of FIG. 9, with the values of the ordinates of each individual curve listed from left to right as seen in FIG. 9.

A function of three variables (X, Y, Z) would be composed of nine families or nine "sheets" of the general nature of FIG. 10. In such a case there would be a total of (9×9×9) or 729 words of data listed for the function interpolation. The location of the Z independent variable is listed after the Y location, and as in the case of the X and Y variables, is listed several times to ensure access to memory 207 during a "hole" in the main program.

As mentioned above in connection with FIG. 3, it is possible to list as many as 4096 words around any one of the $D_1$ to $D_4$ bands of magnetic drum 42, and since four such bands are provided for function generation, there is a total of 16,384 words of storage capacity on drum 42 for use to generate arbitrary functions. Reference back to FIG. 9 indicates that approximately 22 words are required in order to program the generation of one curve, i.e., one function of a single variable having nine data points specified. Thus, if only single-variable functions were stored on the drum, over 740 different functions could be generated. Since functions of two or three variables require more words than single-variable functions, the function generating capacity is accordingly reduced.

To provide for maximum use of drum capacity, the interpolator is constructed so that, by using certain indexing bits in the control words, it is possible to use the same function data or curve with four different independent variables, and to store the results in four different locations in main memory 40. Then, by way of example, it is possible to index through the same set of engine function curves with four different sets of simulated engine variables representing four individual jet engines of the same type on the simulated aircraft. Then the engine data need be written only once on drum 42 instead of four times, thereby saving storage capacity. Where a set of data is indexed in such a manner, however, a given function can be recalculated only one fourth as frequently as if the data were recorded four times, and the use of the indexing process is not preferred for functions which require frequent updating at a rate faster than once every 400 milliseconds. It will be recalled that the $D_1$ to $D_4$ bands are read at the rate of one band per drum revolution (25 milliseconds) so that a given band is read and every listed function is calculated every 100 milliseconds, i.e., ten times per second.

All of the words on the $D_1$ to $D_4$ bands of drum 200 are 11 bits long. The most significant bit is reserved as a control bit and the remaining 10 are for data, so that the ordinates of the breakpoints of the functions are listed with 10-binary-digit resolution. Arithmetic in interpolator 52 is carried to 14 binary places and rounded off. A more complete description of the linear function interpolator is contained in copending application Ser. No. 260,160, filed Feb. 21, 1963 by John M. Hunt, John Kaufmann and Harold R. Dell, and assigned to the assignee of this invention.

Multiplexer 44 and analog-to-digital converter 46, together receive all analog inputs (from cockpit controls, the instructor's station, etc.) and convert them into 14-bit binary numbers, storing the numbers in preassigned (fixed) core memory locations. Each analog input is converted to binary form and stored in its individual core memory location. The multiplexing and conversion of the analog inputs are carried on in parallel with the main program, under priority control, in a completely automatic manner. When any of the input quantities are needed in the computations specified by the main program, they are made available by addressing the appropriate core location. All analog input quantities are scaled in the range of −10 volts DC to +10 volts supplied from reference supplies in computer 10 (not shown). The analog-to-digital conversion apparatus of unit 208 converts these voltages to binary numbers scaled from −1 to +1. The converted analog input signals are sampled and converted into properly signed 14-bit binary words during every two revolutions of magnetic drum 42. However, these signals are sampled only during the first and third quarters of each drum revolution, the second and fourth quarters of each drum revolution being reserved for output sampling. A counter, associated with converter 46, provides the core memory addresses at which each quantity is stored.

Memory access is required, of course, for storage, and the conversion operation is under control of the priority circuitry mentioned above. When an analog input has been sampled, the binary equivalent is held until access to core memory 40 can be obtained. At that time it is stored in the address dictated by the counter. The counter is then advanced, the next output is sampled, and the process continues until all of the analog inputs have been sampled, after which the process repeats itself endlessly, it being noted that this occurs without programming attention or instructions.

Boolean input unit 58 (FIG. 2) operates to provide interrogation signals for as many as 64 groups of 16 contacts, which may take the form of toggle switches, static punch-card readers, and the like, located externally and operated by the student crew and/or an instructor. These contacts provide 1024 one-bit inputs. Counter circuitry within block 58 generates core memory addresses 001 through 064 (decimal, and each 16-bit group of Boolean words, generated by interrogation of the switches, are automatically transferred sequentially to these assigned locations in core memory 207. The Boolean input circuitry is also under control of the priority control unit 56, as shown in FIG. 2.

Digital-to-analog converter 50, which is more completely described in U.S. Patent No. 3,254,337 filed by John M. Hunt and assigned to the assignee of this application, operates in parallel with the main program to provide analog output signals to drive indicators, recorders and the like. The equations which define each of these output quantities must, of course, be implemented in the general program to be computed by computer 10. A fixed word location in main core memory 40 is reserved for each of these quantities, and as each quantity is recalculated in the main program, its new value is stored in its respective memory location. The block of core memory locations containing the 128 output quantities is periodically interrogated, and all of those 128 words are sequentially transferred to buffer core memory unit 48. The 128 words in the buffer memory are fed to 128 individual digital-to-analog converters whose outputs are analog voltage representing the digital quantities.

The storage locations in the core memory 40 reserved for output quantities are all sampled by the buffer memory 48 at a rate of 80 times per second. The buffer core, in turn, is sampled by the digital-to-analog converter 80 times per second.

In order that a maximum of 192 words in core memory 40 be read into buffer core memory 48, 192 separate memory accesses are required, and only one word location in memory 40 may be interrogated during a single 6.105 microsecond machine cycle. The 192 words are arranged to be accessed once during the second quarter of a drum rotation and then accessed again during the fourth quarter of a drum rotation. Since there are 40 drum revolutions per second, and since each word is read into buffer memory 48 twice during each drum revolution, the sampling rate is 80 times per second for all outputs. Digital numbers are read serial-by-word from core memory 40 to buffer memory 48. The words in buffer memory 48 are then read parallel-by-word, serial-by-bit to 192 pulse time-modulated analog channels, which are under timing control of drum address counters. While drum 42 plays no actual part in the output process, its rotation provides a convenient time base for examining the digital-to-analog conversion.

Since there are 4096 word positions around each band on the circumference of the magnetic drum, 1024 words are read during the time that the drum takes to make one quarter of a revolution. The time required to read each word represents the basic machine cycle of 6.105 microseconds. Therefore, one quarter revolution of the drum represents enough time for 1024 possible memory accesses. The buffer memory is under the control of the priority control 56, and, according to the priority schedule provided, may have access to read out of core memory 40 only when the memory is not being accessed by either the main program, the digital interpolator, or the radio-aids preselector. It now will be apparent that there must be at least 192 "holes" in the total access requirements on core memory 40 during each of the second and fourth quarters of a drum revolution, or else all of the output words will not be sampled. In several typical main programs written for the invention, it was found that about 30% of instructions required memory access, so that about 70%, or approximately 720 machine cycles are typically available during a given quarter drum revolution for access by the linear interpolator, the radio aids comparator and either the input converter 46 or buffer memory 48.

A counter in computer 10 generates the core memory addresses of the output quantities that are to be read into buffer memory 48. Upon access of the first address, the counter advances to the next address and holds that address, if necessary, until an opportunity occurs to interrogate that address. The word is then read into buffer 48 and the counter advances again, and the process continues until all addresses have been interrogated and then automatically repeats. Buffer memory 48 comprises a 16 by 192-bit core matrix made up of twelve 16 by 16-bit memory boards. The matrix arrangement is equivalent to a column of 192 words, each word essentially a 16-bit word. The word length in main core unit 207 is 23 magnitude bits plus 1 sign bit. However, only the sign bit and the ten next most significant bits are read into buffer memory 215, thus utilizing only 11 of the available 16 bits per word.

Figure 11:
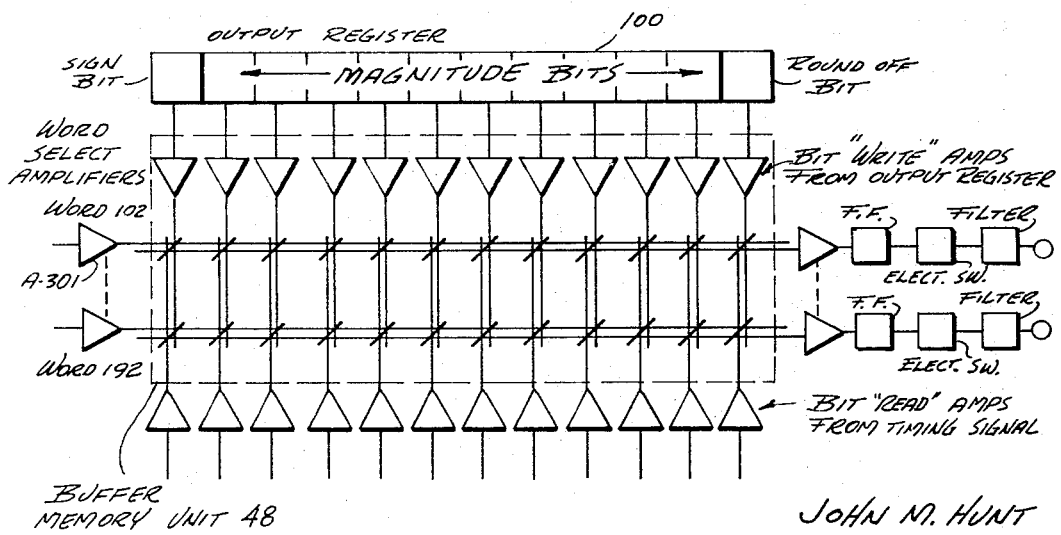
FIG. 11 is a block diagram of the analog output system of the digital computer shown in FIG. 2.

As words are read from main memory 40, they are read into a 12-bit register 100 shown in block form in FIG. 11. Each digit position of register 100 drives its associated vertical wire strung through the corresponding bit position of all 192 words of buffer 48. A series of 192 write amplifiers each drive one of the horizontal wires running through all of the bits constituting a word. After the first output quantity has been read from core memory 40 and into register 100, the horizontal drive amplifier for the first word only, indicated as 102 in FIG. 11, is turned on. This horizontal driver amplifier provides half the total current required to switch the cores of buffer 48. The presence of a "1" in any of the 12 bits of output register 100 causes the corresponding vertical driver to also provide half of the current necessary to switch a core. A "0" output from stage of register 100 causes no current to flow. Hence, it will be seen that if the fields generated by the two wires strung through a core are additive, the presence of a "1" in register 100 causes the corresponding bit in the word concerned to switch to the "1" state, and the presence of a "0" in register 100 leaves the corresponding core in the "0" state, since insufficient current is provided to cause it to switch.

All 12 bits in register 100 are read into buffer 48 simultaneously. The next output quantity in core memory 40 is then read into output register 100 (as soon as memory access is available), and the process is continued until all 192 output quantities have been stored in buffer memory 48. Actually, words stored in core memory 40 are not read into output register 300 in the straight binary form in which they are held in the main memory. Instead they are re-coded in accordance with the following rules:

(1) The sign bit is always inverted, so that a "1" in memory 40 goes into register 100 as a "0," and conversely, a "0" in memory 40 goes into register 100 as a "1."

(2) If the sign bit of the number in memory 40 is negative ("1"), all the remaining magnitude bits are inverted. If the sign bit in memory 40 is positive ("0"), all the magnitude bits are read into the register without inverting.

The following examples demonstrate the transformation.

| Memory Word | Output Register Word |
|---|---|
| 0 1 1 0 1 0 0 0 1 1 1 1 0 | 1 1 1 0 1 0 0 0 1 1 1 |
| 1 1 1 0 1 0 0 0 1 1 1 | 0 0 0 1 0 1 1 1 0 0 0 |
| 1 0 0 0 0 0 0 0 0 0 0 | 0 1 1 1 1 1 1 1 1 1 1 |

These examples are not complete in that the 24-bit word in memory 40 is not actually merely truncated after the 11th bit with no attempt at round-off. Actually output register 100 is 12 bits long, and all the words stored in buffer 48 are 12 bits long. The 12th bit is generated electronically to compensate for round-off error and is used to set the 12th bit of register 100. Thus the bits stored in register 300 have the following significance:

```
     1              2 3 4 5 6 7 8 9 10 11        12
coded sign bit   coded magnitude bits      round-off bit
```

The 12th bit is generated by forming the 1's complement of the 12th bit of the word in main memory 40. For example, if the sign of the word in memory 40 is positive, the 12th bit is transferred to output register 300 unchanged. If the sign of the word in main core 207 is negative, the complement of the 12th bit is transferred to output register 100.

Words stored in buffer 48 are converted to analog voltages by sampling all 192 words, one bit at a time, beginning with all the least significant bits (12th bits) and working backwards to all the most significant bits (sign bits). The 12th and 11th bits are both "looked at," or sampled, by digital-to-analog converter 50 for 6 microseconds each, the 10th bit for 12 microseconds, the 9th bit for 24 microseconds, the 8th bit for 48 microseconds, and so forth, with each succeeding bit being looked at for twice the amount of time devoted to its preceding, less significant bit.

Figure 12:
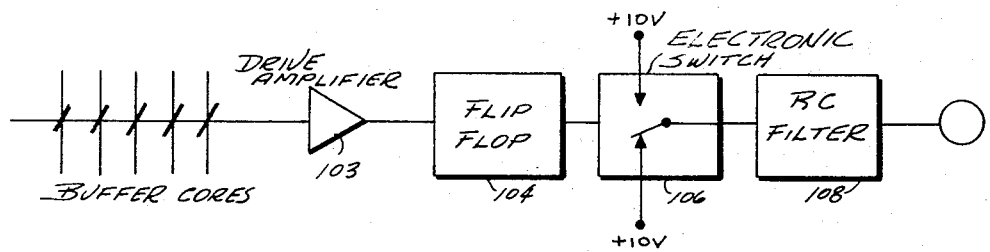
FIG. 12 is a further block diagram of the analog output system shown in FIG. 11.

Each of the 192 digital-to-analog converters consists of a drive amplifier, a flip-flop, an electronic switch, and a three-section RC filter, in the general arrangement shown in FIG. 11 and more specifically in FIG. 12. If the core of buffer 48 being interrogated is in the "1" state, flip-flop 104, associated with that word, then goes to the "1" state and electronic switch 106 goes to +10 volts. If the core is in the "0" state, then flip-flop 104 remains in the "0" state and electronic switch 106 applies −10 volts to filter 108, which integrates or smooths the output of the electronic switch. Once a core has been interrogated, it returns to its "0" state, as a result of the readout operation.

It should be noted that, once an entire word has been sampled by digital-to-analog converter 50, all of the cores associated with that word location in buffer 48 are reset to their "0" states, and ready to be written into again. Since the cores of buffer 48 return to "0" when interrogated, the flip-flop associated with each bit functions to retain the information regarding the original state of the core. The amount of time that any flip-flop remains in any state is determined by the significance, i.e., the order, of the bit that set it. For example, the flip-flops associated with the two least significant bits remain set for 6 microseconds, that associated with the next significant bit remain set for 12 microseconds, etc., up to the flip-flop associated with the sign bit, which remains set for 6144 microseconds.

When writing into buffer 48, all 12 bits of a word are written in parallel, one word after another. When reading from the buffer, all 192 words are read out at the same time, one bit at a time. If the word being read from the buffer 48 is all zero, the output of the transistor switch will be a constant −10 volts. If the word being read is all "1"'s, the switch output will be a constant +10 volts.

Figure 13:
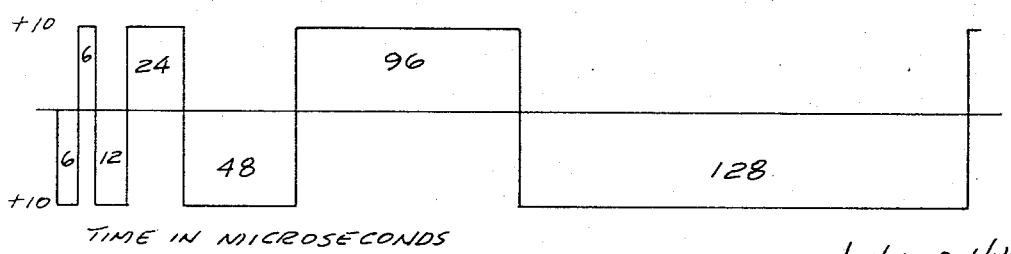
FIG. 13 is a typical output waveform of one of the analog circuits illustrated in FIG. 12.

FIG. 13 is an illustration of the switch output for a word consisting of alternate ones and zeroes, such as:

1 0 1 0 1 0 1 0 1 0 1 0

The Boolean output signals from computer 10 are provided by allotting four 16-bit Boolean words in memory 40, and connecting each of the 64 bit positions provided thereby through a driver amplifier having sufficient power to operate a relay.

For a more complete understanding of the special purpose digital computer which forms a portion of the flight simulator of the present invention, the following specific characteristics of a preferred embodiment are listed, it being understood that deviations therefrom may be made as necessary:

FLIGHT COMPUTER

1. Arithmetic Unit (a) *Data Word Size.*—24 bits (sign bit plus 23 bits magnitude)

(b) *Type of Arithmetic.*—Fixed-point fractional binary with full sign control. Results expressed in true-value magnitude and sign.

(c) *Operational Registers.*—Input (N) Register, Accumulator (A) Register, Multiplier-Quotient (MQ) Register, Salvage (S) Register.

(d) *Arithmetic Operations.*—Add, Subtract, Multiply, Divide, Negative Multiply, Square, Square Root Step, Scale, Shift, and other special operations. Multiply and Divide instruction time=30.5 microseconds. Add instruction time=6.1 microseconds. Basic Add time (without access)=1.0 microsecond.

2. Boolean Arithmetic Unit (a) *Data Word Size.*—1-bit Boolean expressions, stored and accessed in 16-bit words, with 1-bit selection provided through a special bit-alteration mode of the data memory.

(b) *Arithmetic Type.*—Calculation of Boolean functions.

(c) *Operational Registers.*—Input (N) flip-flop, Boolean Accumulator (BA) flip-flop, four salvage (BS) flip-flops.

(d) *Arithmetic Operations.*—Boolean Sum (OR), Boolean Product (AND), Boolean Invert (NOT). All processes performed in basic instruction time of 6.1 microseconds.

3. Data Memory (a) *Type.*—Magnetic core storage for 2,048 24-bit words. Random-access, parallel operation, with 5.0- microseconds cycle time. Memory processes: read-restore, clear-write, and bit alteration.

(b) *Use.*—The data memory is shared by the several portions of the computer subsystem on a priority basis, as follows:

(1) Flight Computer instruction processing.
(2) Linear Interpolator function processing.
(3) Radio Aids station preselection processing.
(4) Flight Computer Input-Output transfers.

4. Priority Control

The Flight Computer instruction program normally will be composed of a large proportion of instructions which require more than one 6.1-microsecond period for execution. For such instructions, only the first 6.1-microsecond period of the 30.5 or 36.6 microseconds of processing time is required for data memory access. Therefore, processing of items of 2, 3, or 4 priority order is peformed automatically during the remaining free time periods. This permits performance of these auxiliary processes without requirement for program control, input-output subroutines, or program-interrupt features.

5. Program Memory (a) *Type.*—Magnetic drum storage. Track length: 4,096 bits. Speed: 40 revolutions/second. Useful storage: 65,382 words, pulse clock tracks.

(b) *Use.*—The drum memory is shared by several portions of the computer subsystem, with space allocations as follows:

(1) *Flight Computer Instructions.*—11 bands, each containing 16 tracks. Useful storage: 40,946 words of 16 bits each.

(2) *Linear Interpolator Instructions and Data.*—Four bands, each containing 11 tracks. Useful storage: 16,344 11-bit words.

(3) *Radio Aids Station Data.*—One band containing 20 tracks. Useful storage: 4,092 20-bit words.

6. Instruction Control (a) *Instruction Form.*—Single-address, dual-process with zero address used as flag to initiate performance of alternate execution process.

(b) *Instruction Size and Format.*—Operation Code: 5 bits. Execution Address: 11 bits. Modification of detail of address region exists for certain instructions.

(c) *Address Modification (Indexing).*—Not provided.

(d) *Logical Branching.*—Not provided.

(e) *Branching.*—Provided in the form of a Conditional Skip instruction which permits non-execution of 1 to 127 following program steps.

(f) *Instruction Processing.*—The 11 bands of instruction storage in the program memory are divided into groups and processed at differing rates, as follows:

| Group | No. Bands | Title | Processing Rate |
|---|---|---|---|
| 1 | 1 | Fast Instruction Band | 20/second. |
| 2 | 2 | Medium Instruction Bands. | 5/second each. |
| 3 | 8 | Slow Instruction Bands | 1.25 second each. |

7. Operational Control (a) *Basic Clock Rates.*—Drum Clock rate: 6.1 microseconds. Operational 1.0-microsecond clock phases (1–6) are synchronized with drum clock, and 0.5-microsecond subphases are synchronized with operational clocks.

(b) *Operational Counters.*—Drum address counter. Drum band sequencing counter. Drum revolution counter. Auxiliary counters for the above information, but under Operating Mode control.

(c) *Operating Modes:*

(1) *Normal.*—Under clock control.

(2) *Single Shot Repeat.*—Under manual control. Repeat one addressed instruction for each operation of control.

(3) *Single Shot Advance.*—Under manual control. Execute addressed instruction, and increase address in Auxilary Counters by one for each operation of control.

(4) *Instruction Replace.*—Manual controls provided for insertion of content and address of a single instruction which will replace drum instruction at addressed location, under manual control, in either normal or single-shot modes.

(5) *Overflow-Check.*—Under manual control. The history of program overflows between successive Store instructions is placed in 24th bit location of data memory.

(6) *Auxilary Process Execution Failure.*—Under manual control. For either Linear Interpolator or Radio Aids process, the occurrence of an execution failure will cause computer to stop, with drum address of failure point contained in auxilary counters, and core address of affected item in appropriate register.

8. Sampled-Data Inputs and Outputs (a) *A/D Multiplexer and Converter*

(1) *Size.*—64 input analog channels, with space provided for extension to 126 channels. Transfers are under priority control.

(2) *Precision.*—14 bits and sign.

(3) *Type.*—Packard-Bell EM-3 Multiplexer, and M-2 Multiverter.

(4) *Sample Rate.*—20/second, for total of 126 channels.

(5) *Conversion Time.*—64 microseconds.

(6) *Input Range.*—±10 volts. Analog Input Passband approximately 0 to 3 c.p.s.

(b) *Digital Switch Inputs*

(1) *Size.*—1,024 binary channels, interrogated in 64 groups of 16 bits, with transfers under priority control.

(2) *Sample Rate.*—20/second, for total of 1,024 channels.

(3) *Input.*—One Form A contact on each switch, etc., to be sampled.

(c) *Digital Switch Outputs*

(1) *Size.*—256 binary storage elements.

(2) *Type.*—Each element is composed of a mercury-wetted Form D contact, with three leads brought out for external use. Modifications of state of these contacts are under priority control.

(3) *Sample Rate.*—10/second, for total of 256 channels.

(d) *D–A Converter*

(1) *Size.*—192 analog output channels. (Modular circuit cards installed only for number of channels required, which is normally 128.)

(2) *Precision.*—11 bits plus sign.

(3) *Output Range.*—±10 volts.

(4) *Sample Rate.*—80/second, for total of 192 channels.

(5) *Input.*—Word-serial from data memory to D–A Core Buffer Memory. A code translator is provided to furnish compatible inputs to D–A unit. Transfers are under priority control.

(6) *Output.*—Word-parallel, bit-serial, pulse-time-modulated analog channels, under timing control from drum address counters. Analog output filer on each channel with passband of approximately 0 to 3 c.p.s.

LINEAR INTERPOLATOR

1. Arithmetic Unit (a) *Data Word Size:*

(1) *From Program Memory.*—10 bits, with sign assumed positive.

(2) *Arithmetic Unit, Internal.*—14 bits, with roundoff. Sign assumed positive.

(3) *Arithmetic Unit, Output.*—16 bits, without roundoff. Sign assumed positive.

(b) *Type of arithmetic.*—Fixed-point fractional binary. Signs assumed positive.

(c) *Arithmetic Operation.*—Linear interpolation process for equidistant increments of argument.

(d) *Process Time.*—120 microseconds for a function of one variable.

(e) *Operation Registers.*—Input Registers, $F(X_n)$ and $F(X_{n+1})$. Accumulator (IA). Multiplier Register (MR). Result Registers (RA) and (RB).

2. Data Memory

The data memory contains argument values, X, Y, and Z. Most significant 14 bits of data word transferred to interpolator input registers under priority control, with argument addresses obtained from program memory as described below. Provides storage for function (answer) values.

3. Program Memory (a) *Interpolator Instructions:*

(1) *Size.*—1-bit flag, 10-bit control word or data memory address.

(2) *Order.*—Order of instruction words in drum band indicates significance, obviating need for operation code.

(1) Control instruction, giving number of variables and indexing information.
(2) X, Y, and Z data memory argument address instructions.
(3) Data.
(4) Answer instruction, data memory address for function.

(3) *Indexing.*—0-3 indexing counter value may be added to all or any combination of X, Y, and Z argument addresses, and to answer address.

(b) *Interpolator Data:*

(1) *Size.*—1-bit flag, 10-bit data word, with sign assumed positive.

(2) *Order.*—For a function of one variable, a straight line approximation to the function with equal intervals of the argument will be provided by nine data words. The represented function will lie entirely within the first quadrant. For a function of two variables, nine such curves will be provided, each composed of nine data words. For a function of three variables, nine pages, each composed of nine curves, will be provided.

4. Interpolator Input Registers (a) *Size.*—14-bits, composed of 1-bit sign, 3-bit argument interval identification, and 10-bit argument increment.

(b) *Operational Registers.*—Three input registers, (X), (Y), and (Z).

(c) *Sign Control.*—If sign is positive, the sign bit is dropped and transferred value is used with sign assumed positive. If sign is negative, the argument value is made identically zero.

(d) *Addresses.*—Data memory addresses of argument values are obtained from interpolator instructions X, Y, and Z in program memory.

5. Interpolator Control

The Linear Interpolator processing is under wired-program control, with process sequencing under priority control, and with selection of process form, selection of indexing, and data memory addressing under instruction control.

6. Interpolator Processing

The Linear Interpoator has inputs and outputs only with respect to the Data Memory for arguments and interpolated function values. Since four Program Memory drum bands are assigned to Interpolator function tables, the complete field of 16,344 word-locations will be processed each 0.1 second. Therefore, interpolated function values are automatically and continuously available to the Flight Computer at this rate.

RADIO AIDS COMPUTER

1. Preselection Unit (a) *Data Word Size.*—10-bits, stored in the Program Memory in parallel groups of two words, forming 20-bit words of the Radio Aids band.

(b) *Type of Process.*—Limit Comparison on Upper and Lower Bounds of ten-bit parallel data words.

(c) *Operational Registers.*—Data Memory Acquisition Address Control for X-position, Y-position, and Frequency-set input data. Upper and Lower Limit Comparators. Selected-Station Data Register. Data Memory Transfer Address Generator for selected station data.

(d) *Process Operations.*—Limit Comparison of X, Y, F control data, preselection of detailed station data words, and transfer to Data Memory.

NOTE. Comparison performed with respect to X, Y control data only for all Marker Stations.

2. Data Memory

Preaddressed locations provided for following preselected data.

| Number of Stations | Station Class | Number of Data Words |
|---|---|---|
| 1 | Middle Marker | 4, 20-bit. |
| 1 | Outer Marker | 4, 20-bit. |
| 1 | Fan-Z Marker | 4, 20-bit, and 4, 16 bit. |
| 2 | LF Stations | 8, 20-bit, and 4, 16-bit. |
| 4 | VHF Stations | 4, 20-bit, and 4, 16-bit. |

Transfer of preselected station data is under priority control.

3. Program Memory

Preaddressed locations provides storage capacity for various types of stations, as follows:

| Station Class | Number of Stations |
|---|---|
| Middle Marker | 32 |
| Outer Marker | 32 |
| Fan-Z Marker | 32 |
| LF Stations | 95 |
| LF/AN Stations | 32 |
| VHF Stations | 127 |
| Total | 350 |

4. Keying Function Generator (a) *Operational Registers.*—Data Memory Address Generator for Call Letter Groups for the preselected stations of Fan-Z Marker, LF, and VHF classes. Data Memory Readout Timing Generator. Keying Signal Generator.

(b) *Operation Mode.*—The main program is permanently blanked during word times 0–7 on all Program Memory bands. This period is used during each fourth drum revolution to transfer out the selected Call Group bit from appropriate preselected stations in the Data Memory.

(c) *Timing.*—The bit timing is 0.1 second. The total Call Group pattern timing is 32 seconds, with a dead band of 6.4 seconds, which is used for operation of external VORTAC signal generator.

What has been shown and described is an improved flight simulator employing a digital computer wherein the computer itself is markedly different from the present generation of general purpose digital computers employing large core memories, with little or no built-in analog-to-digital and digital-to-analog circuitry, and a total lack of interpolator capability. As a result, computer 10 is ideally suited to problems in which a long program must be executed over and over again, functions of several variables must be computed, and the computer must have intimate contact with the outside world, all in real time. Thus, computer 10, which fulfills this set of requirements, is precisely that which is required of a simulation computer. Further, note should be made of the fact that although the invention has been specifically described with respect to a flight simulator, the invention, in its broader aspects, may be employed in conjunction with any vehicle to be simulated, whether the simulated vehicle is designed to travel under water, on water, on land, in the air, or even in outer space.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Grounded training apparatus for simulating the operation of a simulated vehicle in real time comprising,
   (a) a simulated vehicle including a plurality of controls simulating those of an actual vehicle for providing a first group of signals representative of the operation of said controls and a plurality of indicators simulating those of an actual vehicle responsive to a second group of signals;
   (b) computer means including a single multi-address memory first means operable in response to an instruction program to remove, logically modify, and re-enter data in any address of said memory, second means operable in response to data from a first group of addresses in said memory and to ordinate values of a plurality of variables to enter into a second group of addresses in said memory data representative of functions of a number of variables, third means operable in response to data representative of a plurality of limit values for comparing said data with data from a third group of addresses in said memory for entering data resulting from said comparisons in a fourth group of addresses in said memory;
   (c) a read only memory including a plurality of data groups, at least one of said data groups comprising said instruction program, at least one of said data groups comprising said ordinate values of a plurality of variables, at least one of said groups comprising said data representative of a plurality of limit values, and means for simultaneously reading out data from all of said data groups in parallel into said computer means; and
   (d) fourth means coupling said first group of said signals into certain ones of said addresses in said memory and fifth means coupling data comprising said second group of signals from certain others of said addresses in said memory to said indicators in said simulated vehicle.

2. The apparatus of claim 1 including sixth means inhibiting said second and third means from removing data from or re-entering data in said first, second, third and fourth group of addresses during the time intervals said first means is removing data from or re-entering data in any of said addresses.

3. The apparatus of claim 1 wherein said first and second groups of signals comprise analog data signals.

4. The apparatus of claim 3 wherein said fourth means includes analog to digital conversion means and said fifth means includes digital to analog conversion means.

5. The apparatus of claim 1 wherein said multi-address memory is further operable as a buffer storage device during the time intervals information stored in said read only memory is modified.

6. The apparatus of claim 1 wherein said first means includes,
   (a) an arithmetic unit;
   (b) a salvage register;
   (c) means coupling said salvage register to said arithmetic unit; and
   (d) means operable in response to a load instruction word in said instruction program for shifting the contents of said arithmetic unit to said salvage register.

7. Grounded training apparatus for simulating the operation of a simulated vehicle in real time comprising,
   (a) a simulated vehicle including a plurality of controls simulating those of an actual vehicle for providing a first group of signals representative of the operation of said controls and a plurality of indicators simulating those of an actual vehicle responsive to a second group of signals;
   (b) computer means associated with said simulated vehicle to provide real time reactions in said vehicle responsive to the operation of said plurality of controls and to the motion equations of said simulated vehicle including a single random access memory for storing data, first means for updating data stored in said memory in response to a program of instruction words, second means for calculating the functions of a number of variables in response both to selected data stored in said memory and to predetermined data representative of the ordinate values of a plurality of variables, third means for comparing other selected data stored in said memory with a plurality of limit values, a read only memory containing said program of instruction words, said predetermined data representative of the ordinate values of a plurality of variables, and said plurality of limit values, means coupling data from said read only memory to said first, second, and third means in parallel whereby said first, second, and third means are simultaneously operable, and fourth means preventing access by said second means to said random access memory when said first means has access thereto and preventing access by said third means to said random access memory when either said first or second means has access thereto.

8. The apparatus according to claim 12 wherein
   (a) each of said first and second groups of signals include analog signals;
   (b) the data stored in said single random access memory is digital;
   (c) fifth means, including analog-to-digital conversion means, coupling said first group of signals from said simulated vehicle to said random access memory; and
   (d) sixth means, including digital-to-analog conversion means coupling said second group of signals from said random access memory to said simulated vehicle.

9. The apparatus of claim 13 wherein said fourth means is further operable to prevent access by said fifth means to said random access memory when either said first, second, or third means has access thereto and to prevent access by said sixth means to said random access memory when either said first, second, third, or fifth means has access thereto.

10. Grounded flight training apparatus for simulating the operation of a simulated aircraft in real time comprising,
   (a) a student location;
   (b) digital flight computer means;
   (c) said location including a plurality of controls effective to generate analog and Boolean signals representative of the operation of said controls and a plurality of indicating devices operable by analog and Boolean signals;
   (d) means coupling said generated signals to said flight computer means including means to successively convert each of said analog signals to digital signals and thereafter store them in said flight computer means and means to assemble and directly store a group of said Boolean signals in said flight computer means;
   (e) a read only memory including a plurality of data groups, at least one of said data groups comprising an instruction program for said computer means, and means for simultaneously reading out datum from each of said data groups into said flight computer means;
   (f) said flight computer means including means operable in response to data from each of said plurality of data groups to modify said signals stored in said computer means; and (g) means coupling said modified signals to said location including means to successively convert certain ones of said digital signals to analog signals and thereafter operate a number of said indicators and means to disassemble other of said digital signals into individual Boolean signals and operate certain others of said indicators.

11. Grounded flight training apparatus for simulating the operation of a simulated aircraft in real time comprising,
(a) a student's location including a plurality of controls simulating those of an actual aircraft for providing a first group of signals and a plurality of indicators simulating those of an actual aircraft responsive to a second group of signals;
(b) digital flight computer means including a plurality of addressable core memory registers for storing digital data, first means operable in response to an instruction program to remove, logically modify, and re-enter data in any of said registers, second means operable in response to ordinate values of a plurality of variables to enter in selected ones of said registers digital data representative of functions of a number of variables, third means operable in response to data representative of predetermined position and frequency limits for comparing said data with the real time simulated aircraft position and a simulated receiver frequency to enter in selected others of said registers the result of said comparisons, and fourth means inhibiting said second and third means from entering data into said registers during the time interval said first means is removing data from and re-entering data in any of said registers;
(c) a read only magnetic drum memory including a plurality of data groups, at least one of said groups comprising said instruction program, at least one of said groups comprising said ordinate values of a plurality of variables, at least one of said groups comprising said predetermined position and frequency limits, and means for simultaneously reading out data from each of said groups into said flight computer means; and
(d) means coupling said first group of signals from said location to said flight computer means and said modified signals generated by said flight computer means from said flight computer means to said location.

12. The apparatus of claim 11 wherein said addressable registers are further operable as a buffer storage device only during the time interval the predetermined data of said read only memory is being altered.

13. A grounded flight training apparatus for simulating the operation of a simulated aircraft in real time comprising,
(a) a student's station including a plurality of dummy controls and indicators simulating those of an actual aircraft;
(b) first means responsive to operation of said controls for deriving a first plurality of analog voltages;
(c) a random access memory device including a plurality of individually addressable storage locations;
(d) second means operable to sample said analog voltages successively in a predetermined order, to convert selected ones of said analog voltages into a respective parallel digital numerical signal, and to store said digital signals in predetermined ones of said storage locations;
(e) a magnetic drum having a plurality of data groups stored thereon, at least one of said groups consisting of instruction words;
(f) means for reading out from said drum said instruction words in order to provide parallel digital instruction signals;
(g) an arithmetic unit;
(h) means coupling said digital instruction words to said arithmetic unit in order to selectively control said arithmetic unit to read numerical data from certain of said storage locations of said memory device, to perform arithmetic operations on said numerical data, and to store processed numerical data in parallel digital form in others of said storage locations of said memory device;
(i) third means for reading out said parallel digital signals from said other of said storage locations of said memory device and for converting said parallel digital signals to analog output voltages; and
(j) motive means responsive to said analog output voltages for positioning certain of said indicators.

14. The apparatus of claim 13 wherein,
(a) said first means is further effective in response to the operation of said controls for deriving a first plurality of Boolean signals;
(b) fourth means coupling groups of said Boolean signals to predetermined ones of said storage locations of said memory device;
(c) a Boolean arithmetic unit;
(d) means coupling selected ones of said digital instruction words to said Boolean arithmetic unit in order to selectively control said Boolean arithmetic unit, to read Boolean data from certain of said predetermined ones of said storage locations of said memory device, to perform logical operations upon said Boolean data, and to store processed Boolean data in others of said predetermined ones of said storage locations of said memory device; and
(e) fifth means for reading out said processed Boolean data from said others of said predetermined ones of said storage locations of said memory and coupling said data to others of said indicators.

15. The apparatus of claim 14 including,
(a) first and second salvage registers associated with said arithmetic unit and said Boolean arithmetic unit, respectively; and
(b) means operable in response to a load instruction word from said drum to shift the contents of either of said units to the corresponding associated salvage register.

16. The apparatus of claim 13 further including
(a) sixth means operable in response to ordinate values of a plurality of variables to enter in parallel digit form in said others of said storage locations of said memory device data representative of a number of variables;
(b) seventh means operable in response to data representative of predetermined position and frequency limits for comparing said data with the real time simulated aircraft position and receiver frequency to enter in said others of said storage locations of said memory device the digital result of said comparison;
(c) others of said data groups stored on said magnetic drum including said ordinate values of a plurality of variables and said data representative of predetermined position and frequency limits;
(d) further means for reading out said ordinate values and said representative data in parallel with said means for reading out said instruction words; and
(e) eighth means for inhibiting said sixth and seventh means from entering digital data in said others of said storage locations of said memory device during the time interval either of said arithmetic units are removing data from, and entering data in, any of said locations.

17. Apparatus according to claim 13 wherein said second means comprises;
(a) a multiplexer;
(b) an analog to digital converter;
(c) a first electronic counter advanceable in response to a signal to store said digital numerical signals in said memory device;

(d) means for applying signals to advance said counter; and
(e) means responsive to instruction words requiring access by said arithmetic unit to said random access memory device to prevent said counter from advancing.

18. Apparatus according to claim 13 wherein said third means comprises,
(a) a second electronic counter advanceable in response to a signal to read out said digital signals successively in a predetermined order from said memory device;
(b) means for applying signals to advance said counter; and
(c) means responsive to instruction words requiring access by said arithmetic unit to said random access memory device to prevent said counter from advancing.

19. Grounded flight training apparatus for simulating the operation of a simulated aircraft in real time comprising,
(a) a student's station having a plurality of dummy controls and indicators simulating those of an actual aircraft,
(b) a random access memory device having a plurality of individually addressable storage locations;
(c) first means responsive to operation of said controls for deriving a first group of digital signals and storing said signals in a predetermined order in a first group of said storage locations;
(d) a magnetic storage drum having a plurality of instruction words stored thereon;
(e) means for reading out said instruction words to provide digital instruction signals;
(f) a digital arithmetic computing unit and a Boolean logical computing unit each connected to be controlled by said instruction signals and selectively operable to read data from certain of said storage locations of said memory device, to perform predetermined operations on said data, and to store processed data in others of said storage locations to provide output signals; and
(g) means connecting said output signals to control said indicators.

20. Apparatus according to claim 19 wherein said first means includes,
(a) a plurality of voltage deriving means operated by said controls to derive a plurality of analog voltages; and
(b) an analog to digital converter means connected to convert selected ones of said analog voltages to parallel digital signals to be stored in a portion of said first group of storage locations.

21. Apparatus according to claim 19 wherein said first means includes,
(a) a plurality of rotary shaft position encoders mechanically connected to be operated by selected ones of said controls to provide parallel digital signals; and
(b) multiplexing switching means to apply said parallel digital signals to said memory device.

22. Grounded training apparatus for simulating the operation of a simulated vehicle in real time comprising,
(a) a simulated vehicle including a plurality of controls simulating those of an actual vehicle for providing a first group of signals representative of the operation of said controls and a plurality of indicators simulating those of an actual vehicle responsive to a second group of signals;
(b) computer means including a single multi-address core memory, first means operable in response to an instruction program to remove, logically modify, and re-enter data in any address of said memory, second means operable in response to data from a first group of addresses in said memory and to ordinate values of a plurality of variables to enter into a second group of addresses in said memory data representative of functions of a number of variables, third means operable in response to data representative of a plurality of limit values for comparing said data with data from a third group of addresses in said memory for entering data resulting from said comparisons in a fourth group of addresses in said memory;
(c) a read only magnetic drum memory including a plurality of data groups, at least one of said data groups comprising said instruction program, at least one of said data groups comprising said ordinate values of a plurality of variables, at least one of said groups comprising said data representative of a plurality of limit values, and means for simultaneously reading out data from all of said data groups in parallel into said computer means; and
(d) fourth means coupling said first group of said signals into certain ones of said addresses in said memory and fifth means coupling data comprising said second group of signals from certain others of said addresses in said memory to said indicators in said simulated vehicle.

23. Grounded training apparatus for simulating the operation of a simulated vehicle in real time comprising,
(a) a simulated vehicle including a plurality of controls simulating those of an actual vehicle for providing a first group of signals representative of the operation of said controls and a plurality of indicators simulating those of an actual vehicle responsive to a second group of signals;
(b) computer means associated with said simulated vehicle to provide real time reactions in said vehicle responsive to the operation of said plurality of controls and to the motion equations of said simulated vehicle, including a single random access core memory for storing data, first means for updating data stored in said memory in response to a program of instruction words, second means for calculating the functions of a number of variables in response both to selected data stored in said memory and to predetermined data representative of the ordinate values of a plurality of variables, third means for comparing other selected data stored in said memory with a plurality of limit values, a read only memory containing said program of instruction words, said predetermined data representative of the ordinate values of a plurality of variables, and said plurality of limit values, means coupling data from said read only memory to said first, second, and third means in parallel whereby said first, second, and third means are simultaneously operable, and fourth means preventing access by said second means to said random access memory when said first means has access thereto and preventing access by said third means to said random access memory when either said first or second means has access thereto.

References Cited
UNITED STATES PATENTS

| | | | |
|---|---|---|---|
| 2,731,737 | 1/1956 | Stein | 35—12 |
| 2,784,501 | 3/1957 | Stern et al. | 35—12 |
| 2,842,867 | 7/1958 | Dehmel | 35—12 |
| 3,026,036 | 3/1962 | Haanstra et al. | 235—157 |
| 3,094,609 | 6/1963 | Weiss | 235—157 |

EUGENE R. CAPOZIO, *Primary Examiner.*

LAWRENCE CHARLES, *Examiner.*

S. M. BENDER, R. WEIG, *Assistant Examiners.*